United States Patent
Xu et al.

(10) Patent No.: US 11,161,861 B2
(45) Date of Patent: Nov. 2, 2021

(54) BORON-NITROGEN LIGAND WITH CHIRAL 1,2-ETHYLENEDIAMINE BACKBONE, AND PREPARATION METHOD AND USE THEREOF

(71) Applicant: Lanzhou Institute of Chemical Physics, Chinese Academy of Science, Lanzhou (CN)

(72) Inventors: Senmiao Xu, Suzhou (CN); Xiaoliang Zou, Suzhou (CN); Haonan Zhao, Suzhou (CN); Qian Gao, Suzhou (CN)

(73) Assignee: LANZHOU INSTITUTE OF CHEMICAL PHYSICS, CHINESE ACADEMY OF SCIENCE, Lanzhou (CN)

( * ) Notice: Subject to any disclaimer, the term of this patent is extended or adjusted under 35 U.S.C. 154(b) by 0 days.

(21) Appl. No.: 17/252,280

(22) PCT Filed: Jun. 21, 2019

(86) PCT No.: PCT/CN2019/092183
§ 371 (c)(1),
(2) Date: Dec. 15, 2020

(87) PCT Pub. No.: WO2020/019911
PCT Pub. Date: Jan. 30, 2020

(65) Prior Publication Data
US 2021/0253606 A1 Aug. 19, 2021

(30) Foreign Application Priority Data
Jul. 24, 2018 (CN) .......................... 201810820557.8

(51) Int. Cl.
*C07F 7/08* (2006.01)
*B01J 31/18* (2006.01)
*B01J 31/22* (2006.01)

(52) U.S. Cl.
CPC ......... *C07F 7/0812* (2013.01); *B01J 31/1815* (2013.01); *B01J 31/22* (2013.01)

(58) Field of Classification Search
CPC ...... C07F 7/0812; C07F 5/022; C07D 233/02; B01J 31/1815
See application file for complete search history.

(56) References Cited

U.S. PATENT DOCUMENTS 9,074,128 B2 * 7/2015 Stoessel ................ C09K 11/06
2011/0054170 A1 3/2011 McQuade et al.

FOREIGN PATENT DOCUMENTS

CN 102153483 A 8/2011
CN 104447725 A 3/2015
(Continued)

OTHER PUBLICATIONS

Wang, J. Am. Chem. Soc. 2017, 139, p. 91-04 (Year: 2017).*
(Continued)

*Primary Examiner* — Robert C Boyle
(74) *Attorney, Agent, or Firm* — Bayramoglu Law Offices LLC

(57) ABSTRACT

A boron-nitrogen ligand with a chiral 1,2-ethylenediamine backbone, a preparing method and used thereof are provided. The structural formula of the boron-nitrogen ligand is as shown in formula (I):

(Continued)

wherein $R^1$, $R^2$ and $R^3$ are respectively at least independently selected from substituted or unsubstituted $C_3$-$C_{10}$ cycloalkyl, $C_1$-$C_{10}$ alkyl or aryl; $R^4$, $R^5$, $R^6$, $R^7$, $R^8$, $R^9$, $R^{10}$, $R^{11}$ and $R^{12}$ are respectively at least independently selected from hydrogen, halogen, substituted or unsubstituted $C_1$-$C_{10}$ alkyl, $C_1$-$C_4$ alkoxy, $C_3$-$C_{30}$ cycloalkyl or aryl; $Ar^1$ and $Ar^2$ are respectively at least independently selected from substituted or unsubstituted $C_6$-$C_{30}$ aryl. The preparation method of the present application is simple, and can be used for preparing a racemic or chiral boron-nitrogen ligand, which can be used as a catalyst for an asymmetric catalytic reaction and has economic practicability and industrial application prospects.

20 Claims, 1 Drawing Sheet

(56) References Cited

FOREIGN PATENT DOCUMENTS

| | | |
|---|---|---|
| CN | 104725409 A | 6/2015 |
| CN | 107880022 A | 4/2018 |
| JP | 2000159778 A | 6/2000 |

OTHER PUBLICATIONS

Habereder, Appl. Organometal. Chem. 2003, 17, p. 525-538 (Year: 2003).*
Guanghui Wang et al., N,B-Bidentate Boryl Ligand-Supported Iridium Catalyst for Efficient Functional-Group-Directed C—H Borylation, Journal of the American Chemical Society, 2016, pp. 91-94, 139.
Xiaoliang Zou et al., Chiral Bidentate Boryl Ligand Enabled Iridium-Catalyzed Asymmetric C(sp2)—H Borylation of Diarylmethylamines, Journal of the American Chemical Society, 2019, pp. 5334-5342, 141.
Lillian V. A. et al., Role of Hemilabile Diamine Ligands in the Amine-Directed C—H Borylation of Arenes, Organometallics, 2015, pp. 51-55, 34.
Guanghui Wang et al., Double N,B-Type Bidentate Boryl Ligands Enabling a Highly Active Iridium Catalyst for C—H Borylation, Journal of the American Chemical Society, 2015, pp. 8058-8061, 137.
Yusuke Masuda et al., Oxidative Addition of a Strained C—C Bond onto Electron-Rich Rhodium(I) at Room Temperature, Journal of the American Chemical Society, 2013, pp. 7142-7145, 135.
Tzu-Pin Lin et al., Boryl-Mediated Reversible H2 Activation at Cobalt: Catalytic Hydrogenation, Dehydrogenation, and Transfer Hydrogenation, Journal of the American Chemical Society, 2013, pp. 15310-15313, 135.
Catalytic Asymmetric Synthesis, 2nd Edition, Editor: Iwao Ojima, 1999.

* cited by examiner

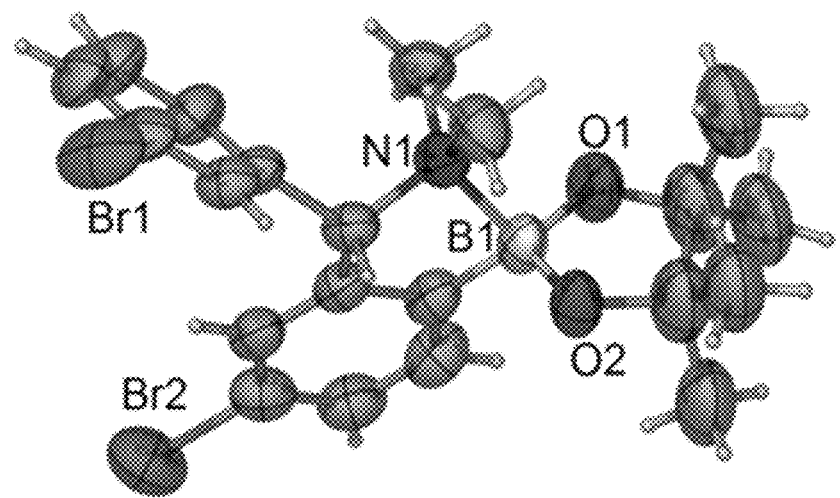

BORON-NITROGEN LIGAND WITH CHIRAL 1,2-ETHYLENEDIAMINE BACKBONE, AND PREPARATION METHOD AND USE THEREOF

CROSS REFERENCE TO THE RELATED APPLICATIONS

This application is the national phase entry of International Application No. PCT/CN2019/092183, filed on Jun. 21, 2019, which is based upon and claims priority to Chinese Patent Application No. 201810820557.8, filed on Jul. 24, 2018, the entire contents of which are incorporated herein by reference.

TECHNICAL FIELD

The present application relates to a boron-nitrogen ligand with a chiral 1,2-ethylenediamine backbone, and a preparation method and use thereof, belonging to the technical field of organic chemistry.

BACKGROUND

Asymmetric catalytic synthesis is currently a hot spot in the research field of organic synthetic chemistry (Ohkuma, T.; Kitamura, M.; Noyori, R. 1999, Catalytic asymmetric synthesis. 2nd Ed.). The key of asymmetric catalytic synthesis is to design and develop excellent chiral ligands and catalyst systems. Chiral 1,2-ethylenediamine structure is a class of commonly-used chiral sources, and the formed transition metal complexes have advantages such as high stereoselectivity and chemoselectivity in an asymmetric catalytic reaction, so the research of such a class of ligands has attracted extensive attention of organic chemists. In recent years, boron-based ligands have gradually attracted people's attention because of their strong electron-donating abilities. For example, tridentate PBP ligands based on 1,2-phenylenediamine can form respective complexes with metals iridium, rhodium and cobalt, and they show good catalytic performances in reactions such as inert bond activation and small molecule activation (J. Am. Chem. Soc. 2013, 135, 7142; J. Am. Chem. Soc. 2013, 135, 15310). Another class of boron-based ligands is bidentate boron-nitrogen ligands, which have been successfully applied into iridium-catalyzed carbon-hydrogen bond boronation reactions (J. Am. Chem. Soc. 2015, 137, 8058; J. Am. Chem. Soc. 2017, 139, 91). At present, however, chiral boron-based ligands have not been reported. In this field, it is still necessary to develop a novel chiral ligand from which a racemate or optically active (optically pure) ligand can be obtained through a simple reaction and which can be used in catalytic reactions.

SUMMARY

A main objective of the present application is to provide a boron-nitrogen ligand with a chiral 1,2-ethylenediamine backbone and a preparation method thereof, so as to overcome the defects of the prior art.

Another objective of the present application is to provide use of the aforementioned boron-nitrogen ligand with a chiral 1,2-ethylenediamine backbone.

In order to achieve the aforementioned objectives of the present invention, the technical solution adopted by the present application includes the following ones.

An embodiment of the present application provides a boron-nitrogen ligand with a chiral 1,2-ethylenediamine backbone, of which the structural formula is as shown in formula (I):

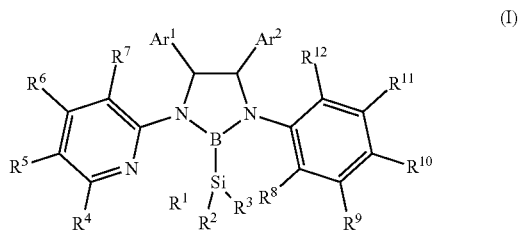

wherein $R^1$, $R^2$ and $R^3$ are respectively at least independently selected from substituted or unsubstituted $C_3$-$C_{10}$ cycloalkyl, $C_1$-$C_{10}$ alkyl or aryl;
$R^4$, $R^5$, $R^6$, $R^7$, $R^8$, $R^9$, $R^{10}$, $R^{11}$ and $R^{12}$ are respectively at least independently selected from hydrogen, halogen, substituted or unsubstituted $C_1$-$C_{10}$ alkyl, $C_1$-$C_4$ alkoxy, $C_3$-$C_{30}$ cycloalkyl or aryl; $Ar^1$ and $Ar^2$ are respectively at least independently selected from substituted or unsubstituted $C_6$-$C_{30}$ aryl.

An embodiment of the present application further provides a method for preparing the aforementioned boron-nitrogen ligand with a chiral 1,2-ethylenediamine backbone, which includes the following steps: reacting an uniformly-mixed reaction system containing a compound of formula (II), a borosilicate agent, a protonic acid catalyst and an organic solvent to react to obtain a boron-nitrogen ligand with a chiral 1,2-ethylenediamine backbone having the structure of formula (I);

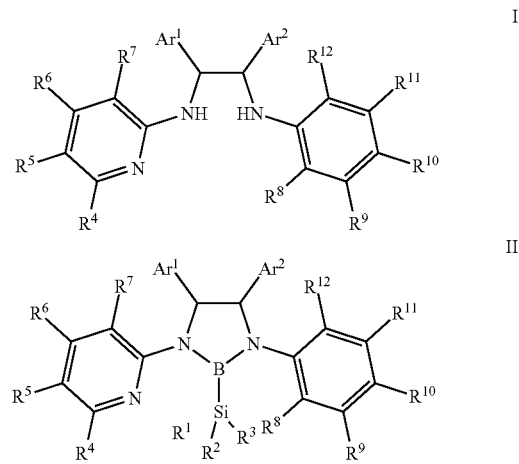

wherein, in the formula (I) and the formula (II), $R^1$, $R^2$ and $R^3$ are respectively at least independently selected from substituted or unsubstituted $C_3$-$C_{10}$ cycloalkyl, $C_1$-$C_{10}$ alkyl or aryl;
$R^4$, $R^5$, $R^6$, $R^7$, $R^8$, $R^9$, $R^{10}$, $R^{11}$ and $R^{12}$ are respectively at least independently selected from hydrogen, halogen, substituted or unsubstituted $C_1$-$C_{10}$ alkyl, $C_1$-$C_4$ alkoxy, $C_3$-$C_{30}$ cycloalkyl or aryl;
$Ar^1$ and $Ar^2$ are respectively at least independently selected from substituted or unsubstituted $C_6$-$C_{30}$ aryl.

An embodiment of the present application further provides use of the aforementioned boron-nitrogen ligand with a chiral 1,2-ethylenediamine backbone as a catalyst or for use in the field of synthetic catalysts.

An embodiment of the present application further provides a catalyst for use in an asymmetric catalytic reaction, which is formed by the complexation reaction between the aforementioned boron-nitrogen ligand with a chiral 1,2-ethylenediamine backbone and a transition metal.

Further, the catalyst is used in the asymmetric carbon-hydrogen bond activation boronization reaction of diarylmethylamine.

An embodiment of the present application also provides a method for preparing a class of chiral diarylmethylamine compounds, including the following steps:

reacting a compound of formula (III) under the action of the aforementioned catalyst to obtain a compound of formula (IV);

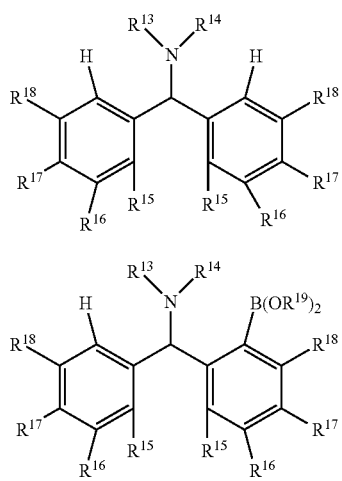

wherein, in the formulas (III) and (IV), $R^{13}$ and $R^{14}$ are respectively at least independently selected from hydrogen, substituted or unsubstituted $C_1$-$C_{10}$ alkyl or $C_3$-$C_{30}$ cycloalkyl; $C_1$-$C_{10}$ alkyl or aryl;

$R^{15}$, $R^{16}$, $R^{17}$ and $R^{11}$ are respectively at least independently selected from hydrogen, halogen, an ester group, an amide group, acyl, an amino group, substituted or unsubstituted $C_1$-$C_{10}$ alkyl, $C_1$-$C_4$ alkoxy, and $C_3$-$C_{30}$ cycloalkyl or aryl;

$R^{19}$ is at least independently selected from substituted or unsubstituted $C_1$-$C_{10}$ alkyl or $C_3$-$C_{30}$ cycloalkyl.

Compared with the prior art, the present application has the following beneficial effects:

1) the present application provides a novel boron-nitrogen ligand with an optically-active chiral 1,2-ethylenediamine backbone, which can be used as a catalyst for an asymmetric catalytic reaction catalyzed by a transition metal; and 2) the present application provides a simple and feasible method for preparing a boron-nitrogen ligand with a racemic or optically-active chiral 1,2-ethylenediamine backbone, which can be conveniently prepared from racemic or optically-pure 1,2-ethylenediamine through a simple reaction, thereby avoiding obtaining a chiral ligand by resolution, and having economic practicability and industrial application prospects.

BRIEF DESCRIPTION OF THE DRAWINGS

FIG. 1s an X-ray crystal diffraction pattern of the 8n compound obtained in Example 9 of the present application.

DETAILED DESCRIPTION OF THE EMBODIMENTS

As mentioned above, in view of the shortcomings of the prior art, the inventor of the disclosure has put forward the technical solution of the present application after extensive and in-depth researches. That is, a boron-nitrogen ligand with a chiral 1,2-ethylenediamine backbone is prepared by a simple reaction, and the step of resolution is omitted, and the ligand can be used as a catalyst for an asymmetric catalytic reaction, which has economic practicability and industrial application prospects.

The technical solution of the present application will be described clearly and completely below. Apparently, the described embodiments are some of the embodiments of the present application, but not all embodiments. Based on the embodiments in the present application, all other embodiments obtained by those of ordinary skills in the art without creative labor are within the claimed scope of the present application.

Firstly, it should be noted that the explanations of the terms mentioned in the specification of the present application are known to those skilled in the art. For example, some of these terms are defined as follows:

The term "alkyl" refers to a saturated linear or branched hydrocarbon moiety, such as —$CH_3$ or —$CH(CH_3)_2$.

The term "alkoxy" refers to a group generated after alkyl is connected with an oxygen atom, such as —$OCH_3$, —$OCH_2CH_3$.

The term "cycloalkyl" refers to a saturated cyclic hydrocarbon moiety, such as cyclohexyl.

The term "aryl" refers to a hydrocarbon moiety containing one or more aromatic rings, including but not limited to phenyl, phenylene, naphthyl, naphthylene, pyrenyl, anthracenyl, phenanthryl, and the like.

Unless otherwise specified, the alkyl, alkoxy, cycloalkyl and aryl described in the present application include both substituted and unsubstituted moieties. Possible substituents on the alkyl, alkoxy, cycloalkyl and aryl include, but are not limited to, $C_1$-$C_6$ alkyl, $C_1$-$C_6$ haloalkyl, $C_2$-$C_6$ alkenyl, $C_2$-$C_6$ alkynyl, $C_3$-$C_{10}$ cycloalkyl, $C_3$-$C_{10}$ cycloalkenyl, $C_1$-$C_6$ alkoxy, aryl, hydroxyl, halogen, amino, etc.

An aspect of the embodiments of the present application provides a boron-nitrogen ligand with a chiral 1,2-ethylenediamine backbone, of which the structural formula is as shown in formula (I):

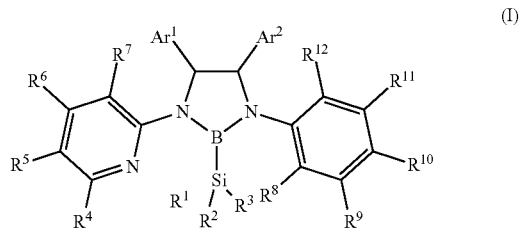

wherein $R^1$, $R^2$ and $R^3$ are respectively at least independently selected from substituted or unsubstituted $C_3$-$C_{10}$ cycloalkyl, $C_1$-$C_{10}$ alkyl or aryl;

$R^4$, $R^5$, $R^6$, $R^7$, $R^8$, $R^9$, $R^{10}$, $R^{11}$ and $R^{12}$ are respectively at least independently selected from hydrogen, halogen, substituted or unsubstituted $C_1$-$C_{10}$ alkyl, $C_1$-$C_4$ alkoxy, $C_3$-$C_{30}$ cycloalkyl or aryl;

$Ar^1$ and $Ar^2$ are respectively at least independently selected from substituted or unsubstituted $C_6$-$C_{30}$ aryl.

The substitution is being substituted by halogen, $C_{1-6}$ alkyl, $C_{1-6}$ haloalkyl, or $C_{1-6}$ alkoxy.

In some embodiments, $R^1$, $R^2$ and $R^3$ are respectively at least independently selected from substituted or unsubstituted $C_3$-$C_{10}$ cycloalkyl, $C_1$-$C_{10}$ alkyl or aryl, etc., but are not limited to this, wherein the number of substituents used for the substitution is more than one, preferably 1-3. That is, the substitution is being monosubstituted, disubstituted or trisubstituted by substituents.

Further, the substituents are at least independently selected from halogen, $C_1$-$C_6$ alkyl, $C_1$-$C_6$ haloalkyl, or $C_1$-$C_6$ alkoxy, etc., but are not limited to this.

In some embodiments, $R^4$, $R^5$, $R^6$, $R^7$, $R^8$, $R^9$, $R^{10}$, $R^{11}$ and $R^{12}$ are respectively at least independently selected from phenyl, substituted phenyl, $C_3$-$C_6$ cycloalkyl, $C_2$-$C_6$ alkyl or $C_1$-$C_4$ alkoxy, etc., but are not limited to this, wherein the number of substituents used for the substitution is more than one, preferably 1-3. That is, the substitution is being monosubstituted, disubstituted or trisubstituted by substituents.

Further, the substituents are at least independently selected from halogen, $C_1$-$C_6$ alkyl, $C_1$-$C_6$ haloalkyl, or $C_1$-$C_6$ alkoxy, etc., but are not limited to this.

In some embodiments, $Ar^1$ and $Ar^2$ are respectively at least independently selected from substituted or unsubstituted $C_6$-$C_{30}$ aryl, etc., but are not limited to this, wherein the number of substituents used for the substitution is more than one, preferably 1-3. That is, the substitution is being monosubstituted, disubstituted or trisubstituted by substituents.

Further, the substituents are at least independently selected from halogen, $C_1$-$C_6$ alkyl, $C_1$-$C_6$ haloalkyl, or $C_1$-$C_6$ alkoxy, etc., but are not limited to this.

In another preferred embodiment, the aryl is selected from any one or a combination of more than two of phenyl, phenylene, naphthyl, naphthylene, pyrenyl, anthracenyl, phenanthryl, and the like, but is not limited to this.

In another preferred embodiment, $Ar^1$ and $Ar^2$ are groups with the same structure.

In some embodiments, the ligand includes a structure as shown in any one of the formulas (Ia) to (Id) below:

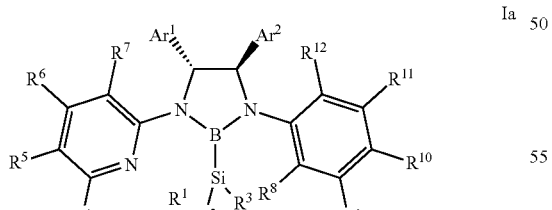

Ia

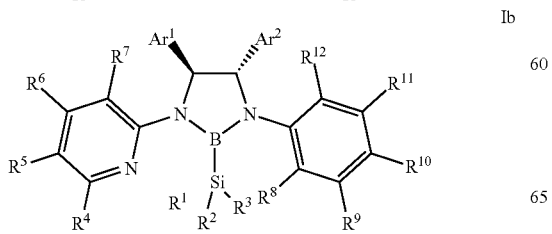

Ib

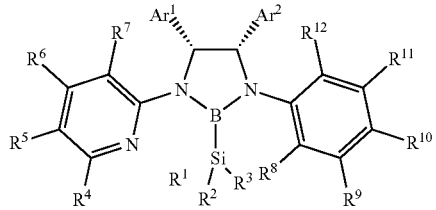

Ic

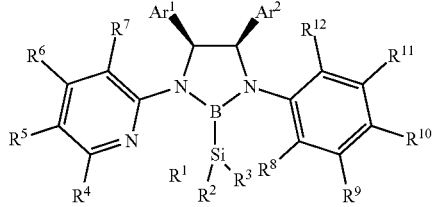

Id

In each of the formulas, $R^1$, $R^2$, $R^3$, $R^4$, $R^5$, $R^6$, $R^7$, $R^8$, $R^9$, $R^{10}$, $R^{11}$, $R^{12}$, $Ar^1$ and $Ar^2$ are as defined above.

Particularly, $R^1$, $R^2$ and $R^3$ are respectively at least independently selected from substituted or unsubstituted $C_3$-$C_{10}$ cycloalkyl, $C_1$-$C_{10}$ alkyl or aryl;

$R^4$, $R^5$, $R^6$, $R^7$, $R^8$, $R^9$, $R^{10}$, $R^{11}$ and $R^{12}$ are respectively at least independently selected from hydrogen, halogen, substituted or unsubstituted $C_1$-$C_{10}$ alkyl, $C_1$-$C_4$ alkoxy, $C_3$-$C_{30}$ cycloalkyl or aryl;

$Ar^1$ and $Ar^2$ are respectively at least independently selected from substituted or unsubstituted $C_6$-$C_{30}$ aryl.

In another preferred embodiment, the ligand includes a compound of formula (Ia) and a compound of formula (Ib).

In another preferred embodiment, the ligand is selected from: the structure of any one of the following formulas (Ia)-(Id), or an enantiomer, racemate or diastereomer of the structure as shown in any one of the following formulas (Ia)-(Id). Among them, the racemate refers to the racemate composed of any one of the compounds of formula (Ia)-(Id) and an enantiomer thereof.

In another more specific preferred embodiment, the ligand includes a structure of any one of the following formulas (6a)-(6j), or an enantiomer, racemate or diastereomer of the structure of any one of the following formulas (6a)-(6j).

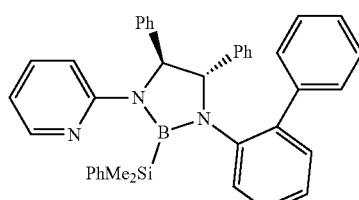

6a

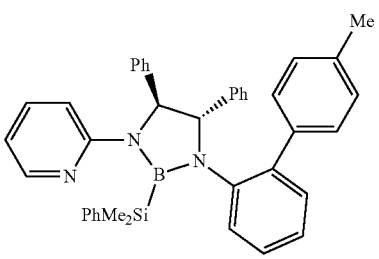

6b

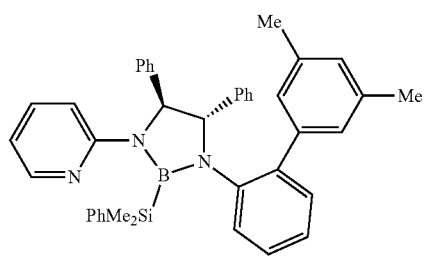

6c

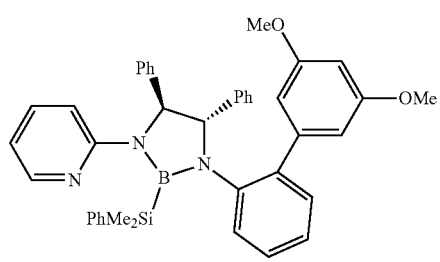

6d

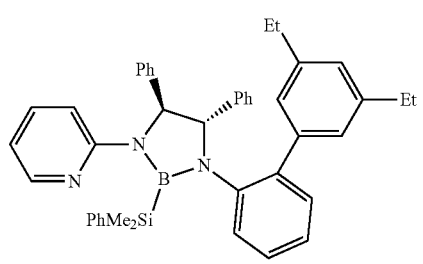

6e

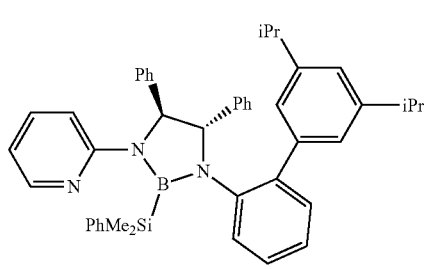

6f

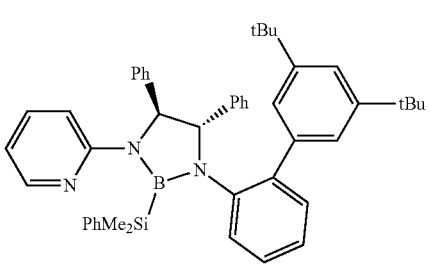

6g

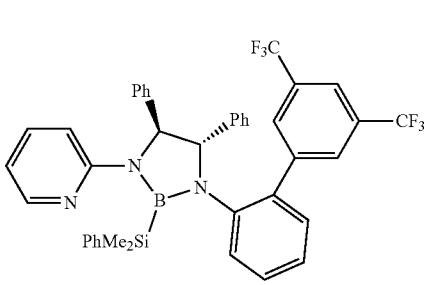

6h

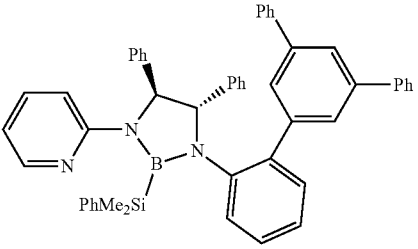

6i

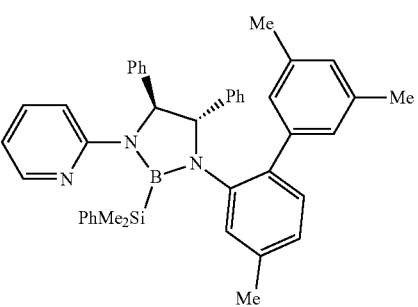

6j

Another aspect of the embodiments of the present application also provides a method for preparing the aforementioned boron-nitrogen ligand with a chiral 1,2-ethylenediamine backbone, including the following steps:

reacting an uniformly-mixed reaction system containing a compound of formula (II), a borosilicate agent, a protonic acid catalyst and an organic solvent to react to obtain a boron-nitrogen ligand with a chiral 1,2-ethylenediamine backbone having the structure of formula (I);

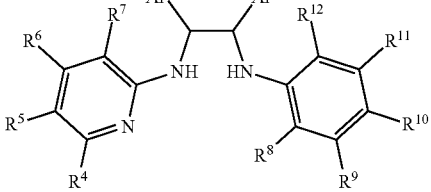

II

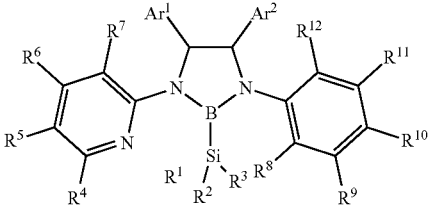

I

In each of the formulas, $R^1$, $R^2$, $R^3$, $R^4$, $R^5$, $R^6$, $R^7$, $R^8$, $R^9$, $R^{10}$, $R^{11}$, $R^{12}$, $Ar^1$ and $Ar^2$ are as defined above.

Particularly, in the formula (I) and the formula (II), $R^1$, $R^2$ and $R^3$ are respectively at least independently selected from substituted or unsubstituted $C_3$-$C_{10}$ cycloalkyl, $C_1$-$C_{10}$ alkyl or aryl;

$R^4$, $R^5$, $R^6$, $R^7$, $R^8$, $R^9$, $R^{10}$, $R^{11}$ and $R^{12}$ are respectively at least independently selected from hydrogen, halogen, substituted or unsubstituted $C_1$-$C_{10}$ alkyl, $C_1$-$C_4$ alkoxy, $C_3$-$C_{30}$ cycloalkyl or aryl;

$Ar^1$ and $Ar^2$ are respectively at least independently selected from substituted or unsubstituted $C_6$-$C_{30}$ aryl.

In some embodiments, the $Ar^1$ has the same structure as the $Ar^2$.

In some embodiments, the chemical formula of the borosilicate agent is $R_1R_2R_3Si$—$B(NiPr_2)_2$, wherein $R^1$, $R^2$ and $R^3$ are respectively at least independently selected from substituted or unsubstituted $C_3$-$C_{10}$ cycloalkyl, $C_1$-$C_{10}$ alkyl or aryl.

Further, in an organic solvent, under the action of a protonic acid catalyst, the compound of formula (II) reacts with $R_1R_2R_3Si$—$B(NiPr_2)_2$ to obtain the compound of formula (I) directly. The reaction formula of the reaction is:

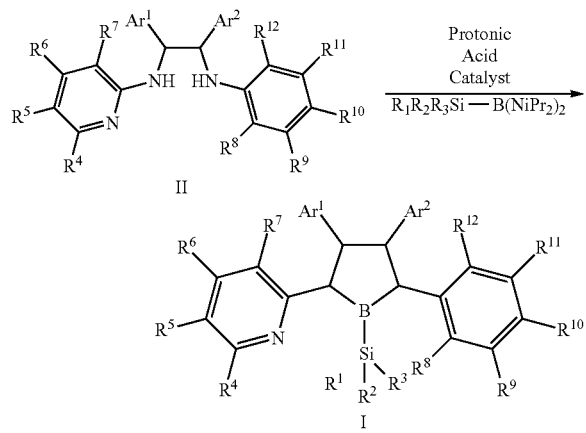

In another preferred embodiment, the molar ratio of the borosilicate agent to the compound of formula (II) is 1:1-3:1, and preferably 1.5:1-2:1.

In another preferred embodiment, the molar ratio of the protonic acid catalyst to the compound of formula (II) is 0.001:1-1:1, and preferably 0.05:1-0.5:1.

Further, the protonic acid catalyst includes any one or a combination of more than two of $H_2SO_4$, $H_3PO_4$, HCl, HBr, $CH_3CO_2H$, $PhCO_2H$, $CF_3CO_2H$, $CF_3SO_3H$, p-$CH_3$—$C_6H_5SO_3H$, $MeSO_3H$ and $tBuCO_2H$, etc., and preferably HCl, but not limited to this.

Further, the organic solvent includes any one or a combination of more than two of benzene, toluene, xylene, dichloromethane, chloroform, carbon tetrachloride, 1,2-dichloroethane, diethyl ether, 1,4-dioxane, tetrahydrofuran, methanol, ethanol, N,N-dimethylformamide and dimethyl sulfoxide, but is not limited to this.

In another preferred embodiment, the temperature of the reaction is 0-180° C., and preferably 80-180° C., and the time of the reaction is 1-48 h, and preferably 12-36 h.

Another aspect of the embodiments of the present application further provides use of the aforementioned boron-nitrogen ligand with a chiral 1,2-ethylenediamine backbone as a catalyst or for use in the field of synthetic catalysts.

Further, the catalyst is a complex formed from the aforementioned boron-nitrogen ligand with a chiral 1,2-ethylenediamine backbone and a transition metal.

Further, the catalyst is a catalyst for an asymmetric catalytic reaction.

Further, the ligand compound of the present application can be used as a catalyst for an asymmetric catalytic reaction. By including an aryl substituent in the 1,2-ethylenediamine backbone, the change of the aryl substituent can effectively adjust the chiral environment, thereby adjusting the chiral control ability of the ligand in different asymmetric catalytic reactions.

In a preferred embodiment, after complexed with a transition metal, the ligand of the present application can be used as a catalyst for the asymmetric carbon-hydrogen bond activation boronization of diarylmethylamine to prepare a class of chiral diarylmethylamine compounds with wide applications.

Another aspect of the embodiments of the present application further provides a catalyst for use in an asymmetric catalytic reaction, which is formed by the complexation reaction between the aforementioned boron-nitrogen ligand with a chiral 1,2-ethylenediamine backbone and a transition metal.

Further, the catalyst is used in the asymmetric carbon-hydrogen bond activation boronization reaction of diarylmethylamine.

Accordingly, another aspect of the embodiments of the present application also provides a method for preparing a class of chiral diarylmethylamine compounds, including the following steps:

reacting a compound of formula (III) under the action of the aforementioned catalyst to obtain a compound of formula (IV);

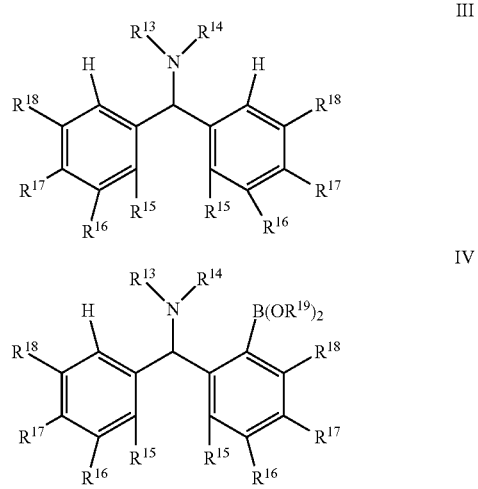

wherein, in the formulas (III) and (IV), $R^{13}$ and $R^{14}$ are respectively at least independently selected from hydrogen, substituted or unsubstituted $C_1$-$C_{10}$ alkyl or $C_3$-$C_{30}$ cycloalkyl; $C_1$-$C_{10}$ alkyl or aryl;

$R^{15}$, $R^{16}$, $R^{17}$ and $R^{11}$ are respectively at least independently selected from hydrogen, halogen, an ester group, an amide group, acyl, an amino group, substituted or unsubstituted $C_1$-$C_{10}$ alkyl, $C_1$-$C_4$ alkoxy, and $C_3$-$C_{30}$ cycloalkyl or aryl;

$R^{19}$ is at least independently selected from substituted or unsubstituted $C_1$-$C_{10}$ alkyl or $C_3$-$C_{30}$ cycloalkyl.

Preferably, the molar ratio of the catalyst to the compound of formula (III) is 0.001:1-0.02:1.

Preferably, the temperature of the reaction is 40-100° C. and the time of the reaction is 2-72 h.

Particularly, the reaction formula of the method for preparing the chiral diarylmethylamine compounds is as follows:

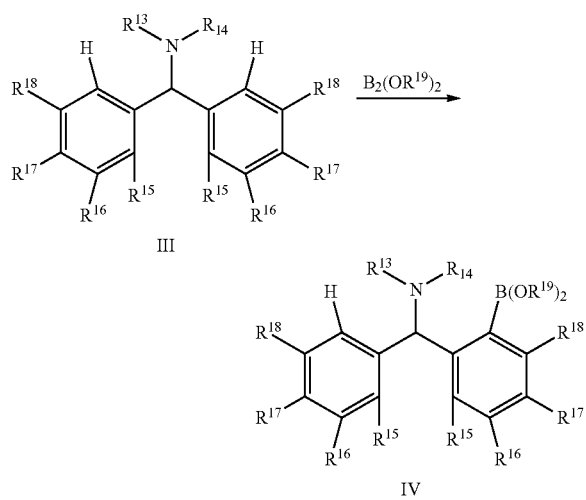

III

IV

By the aforementioned technical solution, the novel boron-nitrogen ligand with an optically-active chiral 1,2-ethylenediamine backbone can be used as a catalyst for the asymmetric catalytic reaction catalyzed by a transition metal; and, the present application provides a simple and feasible method for preparing a boron-nitrogen ligand with a racemic or optically-active chiral 1,2-ethylenediamine backbone, which can be conveniently prepared from racemic or optically-pure 1,2-ethylenediamine through a simple reaction, thereby avoiding obtaining a chiral ligand by resolution, and having economic practicability and industrial application prospects.

In order to further understand the present application, the present application will be further explained in connection with specific examples hereafter. It should be understood that these embodiments are only used for illustrating the present application, rather than limiting the scope of the present application, and the non-essential improvements and adjustments made by those skilled in the art under the core guiding ideology of the present application still belong to the claimed scope of the present application. The experimental methods in the following embodiments which are not specified with specific conditions are generally carried out according to conventional conditions or according to the conditions recommended by the manufacturer.

Unless otherwise specified, the experimental materials used in the following examples, can be available from conventional biochemical reagent stores.

Example 1

In this example, the operation steps of the method for preparing the compound of formula 3a was as follows, and the reaction route was as shown below.

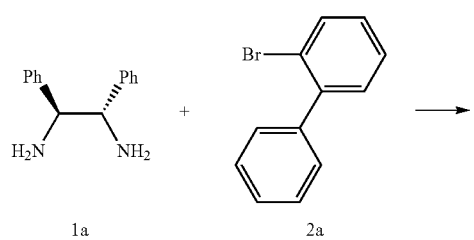

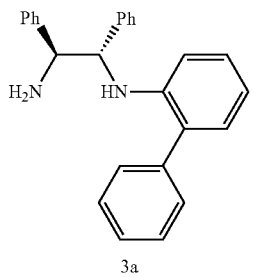

3a

In a glove box, into a 50 mL single-port flask added were 2-phenylbromobenzene 2a (2.33 g, 10.0 mmol), (S,S)-1,2-phenyl-1,2-ethylenediamine 1a (4.24 g, 20.0 mmol, 2.0 equiv), $Pd_2(dba)_3$ (230 mg, 0.25 mmol), racemic BINAP (310 mg, 0.5 mmol), sodium tert-butoxide (1.34 g, 14.0 mmol, 1.4 equiv) and 15 mL of toluene, refluxed at 110° C. for 18 h. The mixture was cooled to room temperature, and then added with 20 mL of ethyl acetate for dilution, and washed with 20 mL of water. Then the organic phase was separated, and the aqueous phase was extracted with ethyl acetate for three times (3×20 mL). Then the organic phases were combined, dried with anhydrous sodium sulfate and filtered. The mother liquor was concentrated and separated by column chromatography (petroleum ether/ethyl acetate=10:1) to obtain 2.19 g of a light yellow solid of the compound of formula 3a, with a yield of 60%.

Upon detection, the NMR (nuclear magnetic resonance) data of the compound of formula 3a as obtained in this example was: $^1$H NMR (400 MHz, $CDCl_3$) δ 7.48 (dd, J=14.1, 6.8 Hz, 1H), 7.39 (t, J=8.8 Hz, 1H), 7.28 (d, J=4.0 Hz, 2H), 7.19 (dd, J=12.5, 5.2 Hz, 2H), 7.14 (d, J=7.2 Hz, 1H), 7.01 (d, J=7.2 Hz, 1H), 6.92 (t, J=7.6 Hz, 1H), 6.59 (t, J=7.2 Hz, 1H), 6.20 (d, J=8.0 Hz, 1H), 5.33 (s, 1H), 4.45 (s, 1H), 4.24 (d, J=3.2 Hz, 1H); $^{13}$C NMR (100 MHz, $CDCl_3$) δ 144.0, 142.5, 141.2, 139.5, 129.8, 129.5, 129.5, 128.7, 128.5, 128.3, 128.1, 127.6, 127.2, 127.2, 127.1, 126.8, 126.6, 116.2, 111.3, 63.5, 60.7; HRMS (ESI) calcd for $C_{26}H_{24}N_2$ ([M+H]$^+$) 365.2012, found 365.2015.

Example 2

With reference to the preparation method of Example 1, compounds of formulas 3b-3j were prepared, and their structures were respectively as shown in the formulas below:

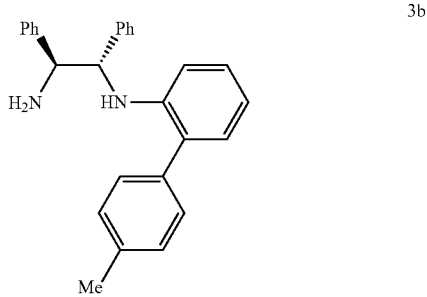

3b

-continued

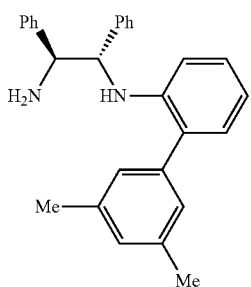

3c

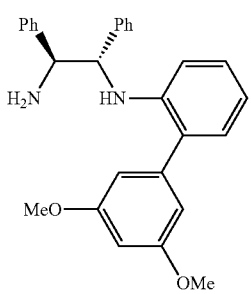

3d

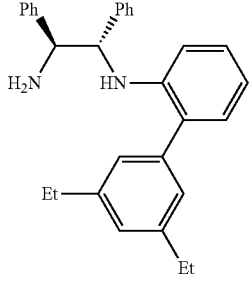

3e

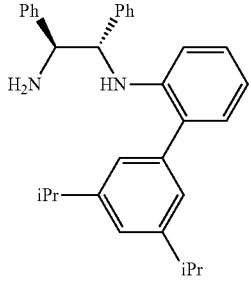

3f

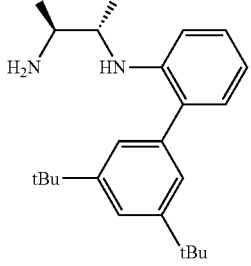

3g

-continued

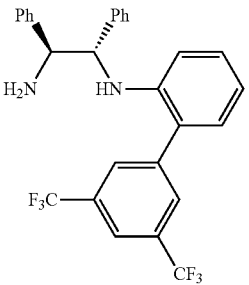

3h

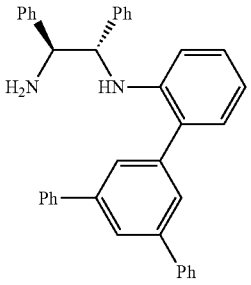

3i

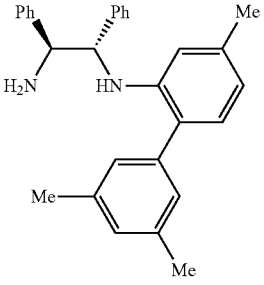

3j

Upon detection, the compound of formula 3b obtained in this example was 2.25 g of a light yellow solid with a yield of 60%, $[\alpha]_D^{25}=-73.8$ (c 0.96, CHCl$_3$). The NMR data of the compound of formula 3b was: $^1$H NMR (400 MHz, CDCl$_3$) δ 7.42-7.16 (m, 14H), 7.01 (d, J=7.2 Hz, 1H), 6.94 (t, J=7.6 Hz, 1H), 6.60 (t, J=7.2 Hz, 1H), 6.20 (d, J=8.4 Hz, 1H), 5.34 (d, J=5.2 Hz, 1H), 4.47 (brs, 1H), 4.29 (brs, 1H), 2.47 (s, 3H); $^{13}$C NMR (101 MHz, CDCl$_3$) δ 144.07, 142.54, 141.26, 136.66, 136.48, 129.91, 129.38, 128.52, 128.10, 127.63, 127.21, 127.15, 126.84, 126.69, 116.24, 111.21, 63.55, 60.82, 21.29; HRMS (ESI) calcd for C$_{27}$H$_{27}$N$_2$ ([M+H]$^+$) 379.2169, found 379.2171.

Upon detection, the compound of formula 3c obtained in this example was 2.45 g of a light yellow solid with a yield of 61%, $[\alpha]_D^{25}=-17.6$ (c 0.72, CHCl$_3$). The NMR data of the compound of formula 3c was: $^1$H NMR (400 MHz, CDCl$_3$) δ 7.25-7.19 (m, 10H), 7.01 (s, 3H), 6.90 (d, J=7.2 Hz, 1H), 6.41 (d, J=7.2 Hz, 1H), 6.06 (s, 1H), 5.37 (brs, 1H), 4.49 (brs, 1H), 4.24 (brs, 1H), 2.40 (s, 6H), 2.08 (s, 3H); $^{13}$C NMR (100 MHz, CDCl$_3$) δ 143.8, 142.6, 141.3, 139.4, 138.0, 137.8, 129.7, 128.6, 128.4, 128.0, 127.3, 127.1, 127.0, 126.8, 126.7, 125.3, 117.0, 111.9, 63.4, 60.8, 21.5, 21.4; HRMS (ESI) calcd for C$_{29}$H$_{31}$N$_2$ ([M+H]$^+$) 407.2482, found 407.2481.

Upon detection, the compound of formula 3d obtained in this example was 2.02 g of a light yellow solid with a yield of 45%, $[\alpha]_D^{25}=-41.9$ (c 0.65, CHCl$_3$). The NMR data of the compound of formula 3d was: $^1$H NMR (400 MHz, CDCl$_3$) δ 7.27-7.02 (m, 10H), 6.93 (d, J=7.2 Hz, 1H), 6.92 (t, J=7.2 Hz, 1H), 6.60-6.53 (m, 4H), 6.22 (d, J=8.0 Hz, 1H), 4.45 (brs, 1H), 4.24 (brs, 1H), 3.81 (s, 6H); $^{13}$C NMR (101 MHz, CDCl$_3$) δ 160.9, 143.9, 142.4, 141.4, 141.2, 129.4, 128.4, 128.3, 128.1, 127.5, 127.1, 126.8, 126.7, 116.1, 111.2, 107.4, 99.4, 63.4, 60.8, 55.3. HRMS (ESI) calcd for C$_{28}$H$_{28}$N$_2$NaO$_2$ ([M+Na]$^+$) 447.2043, found 447.2045.

Upon detection, the NMR data of the compound of formula 3e obtained in this example was: $^1$H NMR (400 MHz, CDCl$_3$) δ 7.26 (s, 1H), 7.25 (s, 2H), 7.21-7.09 (m, 10H), 7.04 (dd, J=7.2, 1.2 Hz, 1H), 6.93-6.88 (m, 1H), 6.58 (t, J=7.2 Hz, 1H), 6.22 (d, J=8.0 Hz, 1H), 5.48 (d, J=4.8 Hz, 1H), 4.45 (s, 1H), 4.21 (d, J=3.6 Hz, 1H), 2.72 (q, J=7.6 Hz, 4H), 1.31 (t, J=7.6 Hz, 6H); $^{13}$C NMR (100 MHz, CDCl$_3$) δ 144.8, 144.3, 143.0, 141.7, 139.8, 130.1, 128.7, 128.4, 128.3, 128.3, 127.4, 127.1, 126.9, 126.7, 126.6, 116.4, 111.4, 63.7, 61.2, 29.2, 16.0; HRMS (ESI) calcd for C$_{30}$H$_{32}$N$_2$Na ([M+Na]$^+$) 443.2458, found 443.2466.

Upon detection, the compound of formula 3f obtained in this example was 2.84 g of a light yellow solid with a yield of 64%, $[α]_D^{25}$=−27.8 (c 0.8, CHCl$_3$). The NMR data of the compound of formula 3f was: $^1$H NMR (400 MHz, CDCl$_3$) δ 7.30-7.06 (m, 14H), 6.94 (t, J=7.6 Hz, 1H), 6.61 (t, J=7.6 Hz, 1H), 6.24 (d, J=8.0 Hz, 1H), 5.49 (s, 1H), 4.44 (d, J=1.6 Hz, 1H), 4.23 (d, J=3.2 Hz, 1H), 3.05-2.95 (m, 2H), 1.35 (d, J=6.4 Hz, 6H), 1.34 (d, J=6.8 Hz, 6H); $^{13}$C NMR (100 MHz, CDCl$_3$) δ 149.2, 144.1, 142.7, 141.5, 139.3, 129.7, 128.5, 128.4, 128.1, 128.0, 127.2, 127.1, 126.9, 126.7, 124.9, 123.7, 116.2, 111.1, 63.4, 60.9, 34.3, 24.3, 24.1; HRMS (ESI) calcd for C$_{32}$H$_{37}$N$_2$Na ([M+H]$^+$) 449.2951, found 449.2950.

Upon detection, the NMR data of the compound of formula 3g obtained in this example was: $^1$H NMR (400 MHz, CDCl$_3$) δ 7.50 (s, 1H), 7.33-7.22 (m, 7H), 7.09-7.03 (m, 6H), 6.95 (t, J=7.6 Hz, 1H), 6.62 (t, J=7.2 Hz, 1H), 6.24 (d, J=8.0 Hz, 1H), 5.49 (s, 1H), 4.41 (s, 1H), 4.21 (d, J=3.2 Hz, 1H), 1.42 (s, 18H); $^{13}$C NMR (100 MHz, CDCl$_3$) δ 151.0, 144.2, 142.6, 141.6, 138.6, 129.7, 128.8, 128.5, 128.1, 128.0, 127.1, 127.1, 126.9, 126.6, 123.7, 121.0, 116.1, 111.0, 63.3, 61.0, 35.0, 31.6; HRMS (ESI) calcd for C$_{34}$H$_{41}$N$_2$ ([M+H]$^+$) 477.3264, found 477.3262.

Upon detection, the compound of formula 3h obtained in this example was 2.51 g of a light yellow solid with a yield of 50%, $[α]_D^{25}$=−38.0 (c 0.87, CHCl$_3$). The NMR data of the compound of formula 3h was: $^1$H NMR (400 MHz, CDCl$_3$) δ 7.97 (s, 2H), 7.95 (s, 1H), 7.44-6.93 (m, 10H), 6.65 (t, J=7.2 Hz, 1H), 6.26 (d, J=8.0 Hz, 1H), 5.46 (d, J=4.4 Hz, 1H), 4.47 (brs, 1H), 4.27 (brs, 1H); $^{13}$C NMR (101 MHz, CDCl$_3$) δ 143.9, 142.6, 142.0, 141.1, 132.0 (q, J$_{CF}$=33 Hz), 130.1, 129.8, 128.7, 128.3, 127.5, 127.4, 126.7, 126.3, 124.4, 123.4 (q, J$_{CF}$=270 Hz), 121.0 (q, J$_{CF}$=3.7 Hz) 116.8, 112.1, 63.3, 60.8. HRMS (ESI) calcd for C$_{28}$H$_{22}$F$_6$N$_2$ ([M+H]$^+$) 501.1760, found 501.1762.

Upon detection, the compound of formula 3i obtained in this example was 3.95 g of a light yellow solid with a yield of 75%, $[α]_D^{25}$=−96.6 (c 0.94, CHCl$_3$). The NMR data of the compound of formula 3i was: $^1$H NMR (400 MHz, CDCl$_3$) δ 7.88 (s, 1H), 7.75 (d, J=7.6 Hz, 4H), 7.66 (s, 2H), 7.50 (t, J=7.2 Hz, 4H), 7.40 (t, J=7.2 Hz, 2H), 7.35-7.27 (m, 4H), 7.26-7.19 (m, 1H), 7.15 (d, J=7.2 Hz, 1H), 7.11-6.90 (m, 6H), 6.65 (t, J=7.2 Hz, 1H), 6.26 (d, J=8.4 Hz, 1H), 5.59 (brs, 1H), 4.49 (brs, 1H), 4.27 (brs, 1H); $^{13}$C NMR (100 MHz, CDCl$_3$) δ 157.6, 147.8, 144.0, 142.2, 140.8, 140.3, 139.6, 138.9, 137.2, 130.1, 128.8, 128.6, 128.3, 128.2, 128.1, 127.5, 127.4, 127.3, 127.1, 127.2, 125.0, 117.3, 113.4, 111.9, 107.41, 63.4, 61.0; HRMS (ESI) calcd for C$_{38}$H$_{33}$N$_2$ ([M+H]$^+$) 517.2638, found 517.2634.

Upon detection, the NMR data of the compound of formula 3j obtained in this example was: $^1$H NMR (400 MHz, CDCl$_3$) δ 7.25-7.19 (m, 10H), 7.01 (s, 3H), 6.90 (d, J=7.2 Hz, 1H), 6.41 (d, J=7.2 Hz, 1H), 6.06 (s, 1H), 5.37 (s, 1H), 4.49 (s, 1H), 4.24 (s, 1H), 2.40 (s, 6H), 2.08 (s, 3H); $^{13}$C NMR (100 MHz, CDCl$_3$) δ 143.8, 142.6, 141.3, 139.4, 138.0, 137.8, 129.7, 128.6, 128.4, 128.0, 127.3, 127.1, 127.0, 126.8, 126.7, 125.3, 117.0, 111.9, 63.4, 60.8, 21.5, 21.4; HRMS (ESI) calcd for C$_{29}$H$_{31}$N$_2$ ([M+H]$^+$) 407.2482, found 407.2481.

Example 3

In this example, the operation steps of the method for preparing the compound of formula 5a was as follows, and the reaction route was as shown below.

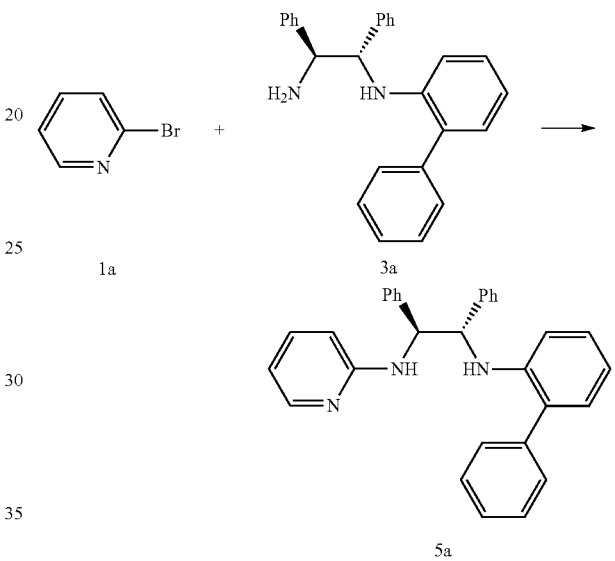

In a glove box, into a 50 mL single-port flask added were the compound 3a (1.82 g, 5.0 mmol) prepared in Example 1, 2-bromopyridine 4a (0.87 g, 5.5 mmol), Pd$_2$dba$_3$ (114 mg, 0.125 mmol), Xantphos (0.145 mg, 0.25 mmol), sodium tert-butoxide (670 mg, 7.0 mmol, 1.4 equiv) and 7.5 mL of toluene. The mixture was refluxed at 110° C. for 18 h. The mixture was cooled to room temperature, then filtered, added with 20 mL of ethyl acetate for dilution, and washed with 20 mL of water. The organic phase was separated, and the aqueous phase was extracted with ethyl acetate for three times (3×20 mL). The organic phases were combined, dried with anhydrous sodium sulfate, and filtered. The mother liquor was concentrated and then separated by column chromatography (petroleum ether/ethyl acetate=20:1) to obtain 1.66 g of a light yellow solid of the compound of formula 5a, with a yield of 75%.

Upon detection, the compound of formula 5a obtained in this example was $[α]_D^{25}$=−120.5 (c 1.58, CHCl$_3$). The NMR data of the compound of formula 5a was: $^1$H NMR (400 MHz, CDCl$_3$) δ 7.89 (d, J=4.0 Hz, 1H), 7.41-7.26 (m, 5H), 7.23-7.06 (m, 9H), 7.04-6.88 (m, 4H), 6.66 (t, J=7.2 Hz, 1H), 6.44 (d, J=6.4 Hz, 1H), 6.39 (d, J=8.0 Hz, 1H), 6.04 (d, J=8.4 Hz, 1H), 5.05 (d, J=6.4 Hz, 1H), 4.95 (t, J=6.4 Hz, 1H), 4.89 (d, J=4.8 Hz, 1H), 4.71 (t, J=5.6 Hz, 1H); $^{13}$C NMR (100 MHz, CDCl$_3$) δ 157.5, 148.0, 143.7, 139.4, 139.1, 138.9, 137.2, 129.9, 129.3, 128.8, 128.3, 127.4, 127.1, 127.1, 117.2, 113.3, 111.7, 107.0, 63.1, 61.0; HRMS (ESI) calcd for C$_{31}$H$_{28}$N$_3$ ([M+H]$^+$) 442.2278, found 442.2282.

Example 4

With reference to the preparation method of Example 3, compounds of formulas 5b-5j were prepared, and their structures were respectively as shown in the formulas below:

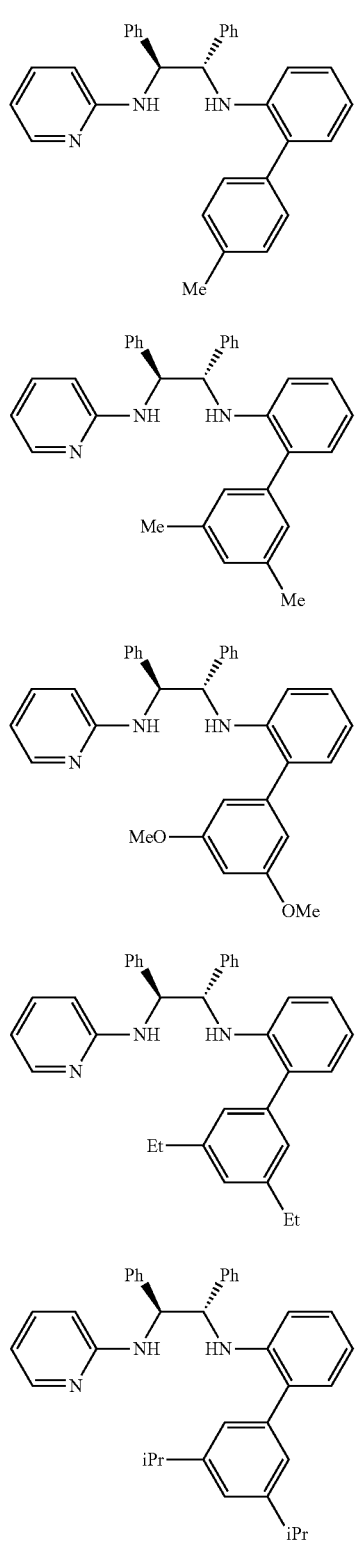

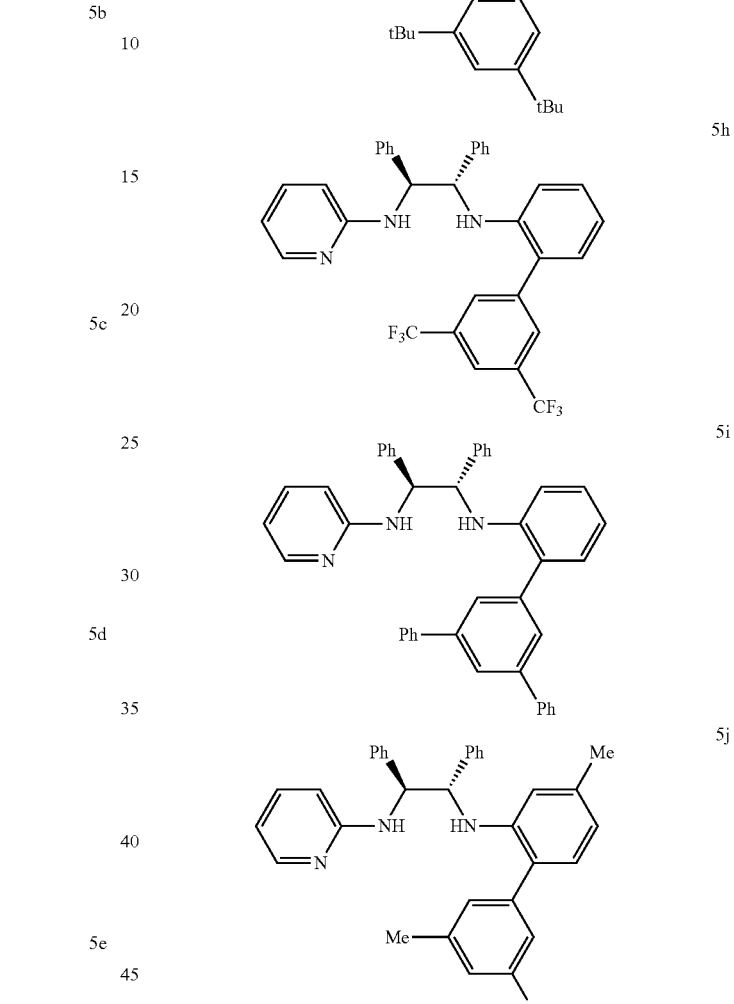

Upon detection, the compound of formula 5b obtained in this example was 1.85 g of a light yellow solid with a yield of 76%, $[\alpha]_D^{25}=-130.6$ (c 0.87, CHCl$_3$). The NMR data of the compound of formula 5b was: $^1$H NMR (400 MHz, CDCl$_3$) δ 7.92 (brs, 1H), 7.22-6.93 (m, 17H), 6.67 (t, J=7.2 Hz, 1H), 6.46 (t, J=5.2 Hz, 1H), 6.37 (d, J=8.0 Hz, 1H), 6.08 (d, J=8.4 Hz, 1H), 5.05 (d, J=5.2 Hz, 1H), 4.94 (t, J=5.6 Hz, 1H), 4.88 (d, J=3.6 Hz, 1H), 4.71 (d, J=4.4 Hz, 1H), 2.40 (s, 3H); $^{13}$C NMR (100 MHz, CDCl$_3$) δ 157.6, 148.0, 143.9, 139.6, 139.0, 137.2, 136.7, 136.1, 129.9, 129.5, 129.2, 128.3, 128.2, 127.4, 127.2, 117.2, 113.3, 111.7, 107.3, 63.2, 61.0, 21.2; HRMS (ESI) calcd for C$_{32}$H$_{29}$N$_3$Na ([M+Na]+) 478.2259, found 478.2263.

Upon detection, the compound of formula 5c obtained in this example was 1.32 g of a light yellow solid with a yield of 56%, $[\alpha]_D^{25}=-111.2$ (c 0.81, CHCl$_3$). The NMR data of the compound of formula 5c was: $^1$H NMR (400 MHz, CDCl$_3$) δ 7.96 (d, J=4.8 Hz, 1H), 7.27-6.90 (m, 16H), 6.67 (t, J=7.6 Hz, 1H), 6.53-6.47 (m, 1H), 6.39 (d, J=8.4 Hz, 1H), 6.10 (d, J=8.4 Hz, 1H), 5.12 (d, J=6.4 Hz, 1H), 4.90 (t, J=6.4 Hz, 1H), 4.85 (d, J=4.8 Hz, 1H), 4.71 (t, J=6.0 Hz, 1H), 2.31 (s, 6H); $^{13}$C NMR (100 MHz, CDCl$_3$) δ 157.7, 148.1, 143.7, 139.5, 139.0, 138.3, 137.3, 129.8, 128.9, 128.6, 128.3, 128.2, 127.6, 127.5, 127.4, 127.3, 127.1, 117.2, 113.5, 111.6, 107.2, 63.1, 61.1, 21.3; HRMS (ESI) calcd for C$_{33}$H$_{32}$N$_3$ ([M+H]$^+$) 470.2596, found 470.2594.

Upon detection, the compound of formula 5d obtained in this example was 1.26 g of a light yellow solid with a yield of 50%, [α]$_D$$^{25}$=−71.9 (c 0.62, CHCl$_3$). The NMR data of the compound of formula 5d was: $^1$H NMR (400 MHz, CDCl$_3$) δ 7.95 (d, J=3.6 Hz, 1H), 7.25-7.00 (m, 11H), 6.92 (d, J=6.8 Hz, 2H), 6.67 (t, J=7.2 Hz, 1H), 6.52-6.46 (m, 4H), 6.40 (d, J=8.0 Hz, 1H), 6.12 (d, J=8.4 Hz, 1H), 5.05 (d, J=6.8 Hz, 1H), 4.97-4.93 (m, 2H), 4.73 (t, J=5.6 Hz, 1H), 3.82 (s, 6H); $^{13}$C NMR (100 MHz, CDCl$_3$) δ 161.0, 157.6, 148.0, 143.7, 141.1, 139.4, 138.8, 137.3, 129.6, 128.5, 128.3, 127.6, 127.5, 127.3, 117.0, 113.5, 111.7, 107.3, 107.1, 99.8, 82.8, 60.9, 55.3; HRMS (ESI) calcd for C$_{33}$H$_{32}$N$_3$O$_2$ ([M+H]$^+$) 502.2495, found 502.2486.

Upon detection, the compound of formula 5e obtained in this example was 1.42 g of a light yellow solid with a yield of 57%, [α]$_D$$^{25}$=−91.8 (c 1.54, CHCl$_3$). The NMR data of the compound of formula 5e was: $^1$H NMR (400 MHz, CDCl$_3$) δ 7.94 (d, J=5.2 Hz, 1H), 7.26-7.00 (m, 14H), 6.91 (d, J=7.2 Hz, 2H), 6.69 (t, J=7.2 Hz, 1H), 6.52-6.47 (m, 1H), 6.43 (d, J=8.0 Hz, 1H), 6.09 (d, J=8.8 Hz, 1H), 5.22 (d, J=6.0 Hz, 1H), 4.88 (t, J=6.0 Hz, 2H), 4.71 (t, J=6.0 Hz, 1H), 2.63 (q, J=7.6 Hz, 4H), 1.23 (t, J=7.6 Hz, 6H); $^{13}$C NMR (100 MHz, CDCl$_3$) δ 157.6, 147.8, 144.7, 143.7, 139.4, 139.0, 138.9, 137.4, 129.9, 128.8, 128.3, 128.2, 127.5, 127.4, 127.3, 127.2, 126.5, 126.2, 117.2, 113.4, 111.6, 107.2, 63.0, 61.0, 28.8, 15.6; HRMS (ESI) calcd for C$_{35}$H$_{36}$N$_3$ ([M+H]$^+$) 498.2729, found 498.2724.

Upon detection, the compound of formula 5f obtained in this example was 1.92 g of a light yellow solid with a yield of 70%, [α]$_D$$^{25}$=−85.7 (c 0.56, CHCl$_3$). The NMR data of the compound of formula 5f was: $^1$H NMR (400 MHz, CDCl$_3$) δ 7.91 (d, J=4.4 Hz, 1H), 7.21-7.00 (m, 14H), 6.89 (d, J=7.2 Hz, 2H), 6.69 (t, J=7.2 Hz, 1H), 6.47 (d, J=7.2 Hz, 2H), 6.06 (d, J=8.4 Hz, 1H), 5.13 (d, J=6.0 Hz, 1H), 4.93 (d, J=5.2 Hz, 1H), 4.88 (t, J=6.0 Hz, 1H), 4.71 (t, J=5.6 Hz, 1H), 2.96-2.84 (m, 2H), 1.25 (d, J=6.8 Hz, 12H); $^{13}$C NMR (100 MHz, CDCl$_3$) δ 157.6, 149.3, 148.0, 143.7, 139.4, 139.0, 138.9, 137.2, 129.9, 129.0, 128.3, 128.2, 128.1, 127.5, 127.5, 127.3, 127.2, 124.8, 123.8, 117.2, 113.4, 111.5, 107.2, 62.9, 61.0, 34.1, 24.2, 24.0; HRMS (ESI) calcd for C$_{37}$H$_{39}$N$_3$Na ([M+Na]$^+$) 548.3042, found 548.3048.

Upon detection, the compound of formula 5g obtained in this example was 2.14 g of a light yellow solid with a yield of 77%, [α]$_D$$^{25}$=−75.2 (c 0.80, CHCl$_3$). The NMR data of the compound of formula 5g was: $^1$H NMR (400 MHz, CDCl$_3$) δ 7.89 (d, J=4.8 Hz, 1H), 7.43 (s, 1H), 7.26 (s, 2H), 7.21 (m, 4H), 7.11-7.00 (m, 7H), 6.87 (d, J=7.6 Hz, 2H), 6.71 (t, J=7.2 Hz, 1H), 6.48 (dd, J=13.2, 7.2 Hz, 2H), 6.06 (d, J=8.4 Hz, 1H), 5.09 (d, J=6.0 Hz, 1H), 4.93 (d, J=5.6 Hz, 1H), 4.89 (t, J=5.6 Hz, 1H), 4.71 (t, J=5.6 Hz, 1H), 1.34 (s, 18H); $^{13}$C NMR (100 MHz, CDCl$_3$) δ 157.5, 151.1, 148.0, 143.8, 139.4, 138.9, 138.2, 137.1, 130.0, 129.5, 128.3, 128.2, 128.1, 127.5, 127.5, 127.3, 127.1, 123.6, 121.1, 117.2, 113.4, 111.5, 107.3, 62.8, 60.9, 34.9, 31.5; HRMS (ESI) calcd for C$_{39}$H$_{44}$N$_3$ ([M+H]$^+$) 554.3535, found 554.3519.

Upon detection, the compound of formula 5h obtained in this example was 2.10 g of a light yellow solid with a yield of 70%, [α]$_D$$^{25}$=−47.3 (c 1.20, CHCl$_3$). The NMR data of the compound of formula 5h was: $^1$H NMR (400 MHz, CDCl$_3$) δ 7.86 (s, 3H), 7.68 (d, J=4.4 Hz, 1H), 7.29-7.03 (m, 11H), 6.97-6.92 (m, 3H), 6.71 (t, J=7.2 Hz, 1H), 6.56 (d, J=8.4 Hz, 1H), 6.45 (t, J=6.0 Hz, 1H), 6.15 (d, J=8.4 Hz, 1H), 5.10 (m, 2H), 4.82 (d, J=6.8 Hz, 1H), 4.73 (t, J=6.0 Hz, 1H); $^{13}$C NMR (100 MHz, CDCl$_3$) δ 157.5, 147.5, 143.9, 141.9, 139.6, 139.0, 137.2, 132 (q, J$_{CF}$=33.0 Hz), 130.1, 129.8, 128.4, 128.3, 127.7, 127.6, 127.2, 125.0, 123.3 (q, J$_{CF}$=271.1 Hz), 121.0 (q, J$_{CF}$=4.1 Hz), 117.5, 113.6, 112.2, 108.0, 63.7, 60.7; HRMS (ESI) calcd for C$_{33}$H$_{25}$F$_6$N$_3$Na ([M+Na]$^+$) 600.1850, found 600.1850.

Upon detection, the compound of formula 5i obtained in this example was 1.63 g of a light yellow solid with a yield of 55%, [α]$_D$$^{25}$=−97.6 (c 1.27, CHCl$_3$). The NMR data of the compound of formula 5i was: $^1$H NMR (400 MHz, CDCl$_3$) δ 7.81 (s, 2H), 7.66 (d, J=7.2 Hz, 4H), 7.58 (s, 2H), 7.46 (t, J=7.2 Hz, 4H), 7.38 (t, J=7.2 Hz, 2H), 7.23-6.87 (m, 13H), 6.72 (t, J=7.2 Hz, 1H), 6.49 (d, J=8.0 Hz, 1H), 6.38 (t, J=5.6 Hz, 1H), 6.00 (d, J=8.4 Hz, 1H), 5.15-5.05 (m, 2H), 4.97 (t, J=5.2 Hz, 1H), 4.76 (s, 1H); $^{13}$C NMR (100 MHz, CDCl$_3$) δ 157.7, 148.0, 144.1, 142.4, 141.0, 140.4, 139.7, 139.1, 137.3, 130.2, 129.0, 128.8, 128.5, 128.4, 128.3, 127.6, 127.5, 127.4, 127.3, 127.2, 125.2, 117.5, 113.5, 112.1, 107.6, 63.5, 61.1; HRMS (ESI) calcd for C$_{43}$H$_{36}$N$_3$ ([M+H]$^+$) 594.2909, found 594.2905.

Upon detection, the compound of formula 5j obtained in this example was 1.64 g of a light yellow solid with a yield of 65%, [α]$_D$$^{25}$=−73.9 (c 0.83, CHCl$_3$). The NMR data of the compound of formula 5j was: $^1$H NMR (400 MHz, CDCl$_3$) δ 7.97 (s, 1H), 7.28-7.06 (m, 9H), 6.89-6.98 (m, 6H), 6.47-6.53 (m, 2H), 6.24 (s, 1H), 6.10 (d, J=8.0 Hz, 1H), 5.14 (d, J=5.6 Hz, 1H), 4.90 (t, J=6.4 Hz, 1H), 4.79 (d, J=4.0 Hz, 1H), 4.71 (t, J=6.0 Hz, 1H), 2.29 (s, 6H), 2.15 (s, 3H); $^{13}$C NMR (100 MHz, CDCl$_3$) δ 157.7, 148.1, 143.6, 139.5, 139.1, 139.0, 138.2, 137.9, 137.3, 129.7, 128.7, 128.3, 128.2, 127.6, 127.5, 127.4, 127.3, 127.2, 125.9, 118.0, 113.4, 112.4, 107.2, 63.0, 60.9, 21.6, 21.3; HRMS (ESI) calcd for C$_{34}$H$_{33}$N$_3$Na ([M+H]$^+$) 506.2572, found 506.2576.

Example 5-1

In this example, the operation steps of the method for preparing the compound of formula (S,S)-6a was as follows, and the reaction route was as shown below.

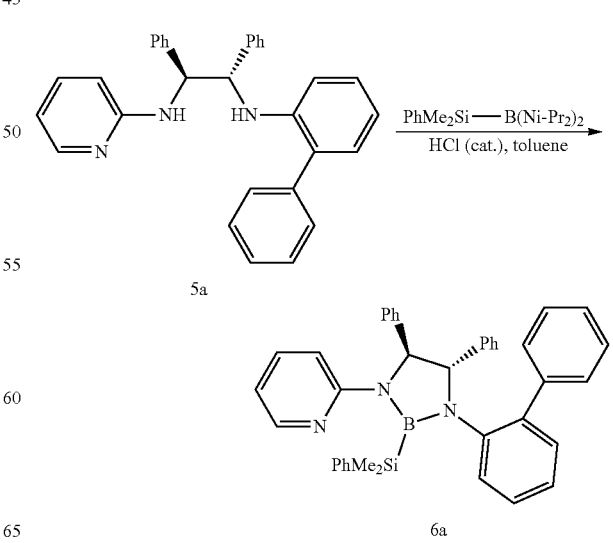

In a glove box, into a 25 mL Schlenk tube added were the compound of formula 5a (442 mg, 1.0 mmol) prepared in Example 3, PhMe$_2$Si—B(NiPr$_2$)$_2$ (520 mg, 1.50 mmol, 1.5 equiv), 1.0 mL of toluene, and 5 μL of a solution of 1,4-dioxane in hydrochloric acid (4 M). The mixture was reacted at 160° C. for 24 h, and cooled to room temperature. Then the solvent is removed, and the residue was recrystallized with n-hexane to obtain the compound of formula 6a as the ligand.

Upon detection, the compound of formula 6a obtained in this example was 360 mg of a white solid with a yield of 61%, and its NMR data was: $^1$H NMR (400 MHz, CDCl$_3$) δ 8.07 (d, J=4.4 Hz, 1H), 7.71 (d, J=6.8 Hz, 2H), 7.30-7.12 (m, 13H), 7.05-6.96 (m, 9H), 6.89 (d, J=7.2 Hz, 1H), 6.63 (t, J=6.0 Hz, 1H), 6.03 (d, J=8.4 Hz, 1H), 4.79 (s, 1H), 3.98 (s, 1H), 0.32 (s, 3H), 0.22 (s, 3H); $^{13}$C NMR (100 MHz, CDCl$_3$) δ 156.5, 147.3, 142.8, 142.4, 142.2, 140.7, 139.7, 138.0, 137.1, 134.3, 131.5, 130.5, 128.7, 128.5, 128.2, 128.1, 127.9, 127.6, 127.3, 127.1, 127.0, 126.8, 126.6, 125.9, 125.3, 115.6, 109.0, 75.2, 70.4, −0.6, −1.0; HRMS (ESI) calcd for C$_{39}$H$_{37}$BN$_3$Si ([M+H]$^+$) 586.2850, found 586.2860.

Example 5-2

In a glove box, into a 25 mL Schlenk tube added were the compound of formula 5a (442 mg, 1.0 mmol) prepared in Example 3, PhMe$_2$Si—B(NiPr$_2$)$_2$ (1040 mg, 3.0 mmol, 3.0 equiv), 1.0 mL of toluene, and 5 μL of a solution of 1,4-dioxane in hydrochloric acid (4 M). The mixture was reacted at 160° C. for 24 h, and cooled to room temperature. Then the solvent is removed, and the residue was recrystallized with n-hexane to obtain the compound of formula 6a as the ligand, with a yield of 48%.

Example 5-3

In a glove box, into a 25 mL Schlenk tube added were the compound of formula 5a (442 mg, 1.0 mmol) prepared in Example 3, PhMe$_2$Si—B(NiPr$_2$)$_2$ (347 mg, 1.0 mmol, 1.0 equiv), 1.0 mL of toluene, and 5 μL of a solution of 1,4-dioxane in hydrochloric acid (4 M). The mixture was reacted at 160° C. for 24 h, and cooled to room temperature. Then the solvent is removed, and the residue was recrystallized with n-hexane to obtain the compound of formula 6a as the ligand, with a yield of 30%.

Example 5-4

In a glove box, into a 25 mL Schlenk tube added were the compound of formula 5a (442 mg, 1.0 mmol) prepared in Example 3, PhMe$_2$Si—B(NiPr$_2$)$_2$ (520 mg, 1.50 mmol, 1.5 equiv), 1.0 mL of toluene, and 2.5 μL of a solution of 1,4-dioxane in hydrochloric acid (4 M). The mixture was reacted at 160° C. for 24 h, and cooled to room temperature. Then the solvent is removed, and the residue was recrystallized with n-hexane to obtain the compound of formula 6a as the ligand, with a yield of 20%.

Example 5-5

In a glove box, into a 25 mL Schlenk tube added were the compound of formula 5a (442 mg, 1.0 mmol) prepared in Example 3, PhMe$_2$Si—B(NiPr$_2$)$_2$ (520 mg, 1.50 mmol, 2.0 equiv), 1.0 mL of toluene, and 10 μL of a solution of 1,4-dioxane in hydrochloric acid (4 M). The mixture was reacted at 80° C. for 24 h, and cooled to room temperature. Then the solvent is removed, and the residue was recrystallized with n-hexane to obtain the compound of formula 6a as the ligand, with a yield of 38%.

Example 5-6

In a glove box, into a 25 mL Schlenk tube added were the compound of formula 5a (442 mg, 1.0 mmol) prepared in Example 3, PhMe$_2$Si—B(NiPr$_2$)$_2$ (520 mg, 1.50 mmol, 1.5 equiv), 1.0 mL of toluene, and 5 μL of a solution of 1,4-dioxane in hydrochloric acid (4 M). The mixture was reacted at 0° C. for 48 h, and cooled to room temperature. Then the solvent is removed, and the residue was recrystallized with n-hexane to obtain the compound of formula 6a as the ligand, with a yield of 3%.

Example 5-7

In a glove box, into a 25 mL Schlenk tube added were the compound of formula 5a (442 mg, 1.0 mmol) prepared in Example 3, PhMe$_2$Si—B(NiPr$_2$)$_2$ (520 mg, 1.50 mmol, 1.5 equiv), 1.0 mL of toluene, and 5 μL of a solution of 1,4-dioxane in hydrochloric acid (4 M). The mixture was reacted at 180° C. for 1 h, and cooled to room temperature. Then the solvent is removed, and the residue was recrystallized with n-hexane to obtain the compound of formula 6a as the ligand, with a yield of 55%.

Example 5-8

In a glove box, into a 25 mL Schlenk tube added were the compound of formula 5a (442 mg, 1.0 mmol) prepared in Example 3, PhMe$_2$Si—B(NiPr$_2$)$_2$ (520 mg, 1.50 mmol, 1.5 equiv), 1.0 mL of toluene, and 5 μL of a solution of 1,4-dioxane in hydrochloric acid (4 M). The mixture was reacted at 160° C. for 12 h, and cooled to room temperature. Then the solvent is removed, and the residue was recrystallized with n-hexane to obtain the compound of formula 6a as the ligand, with a yield of 32%.

Example 5-9

In a glove box, into a 25 mL Schlenk tube added were the compound of formula 5a (442 mg, 1.0 mmol) prepared in Example 3, PhMe$_2$Si—B(NiPr$_2$)$_2$ (520 mg, 1.50 mmol, 1.5 equiv), 1.0 mL of toluene, and 5 μL of a solution of 1,4-dioxane in hydrochloric acid (4 M). The mixture was reacted at 160° C. for 36 h, and cooled to room temperature. Then the solvent is removed, and the residue was recrystallized with n-hexane to obtain the compound of formula 6a as the ligand, with a yield of 60%.

Example 6

With reference to the preparation method of Example 5, compounds of formulas 6b-6j were prepared, and their structures were respectively as shown in the formulas below:

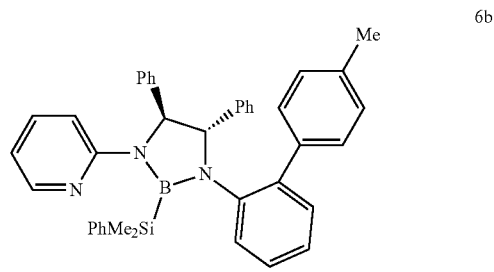

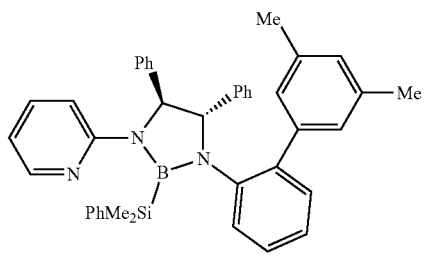
6c

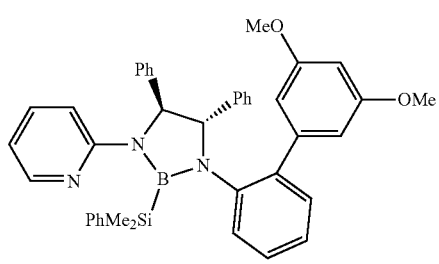
6d

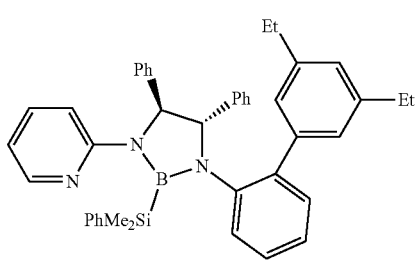
6e

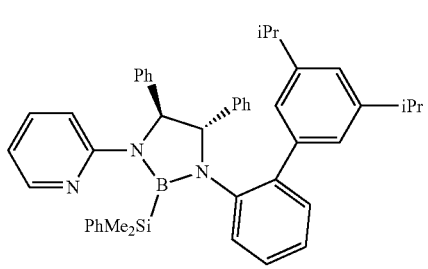
6f

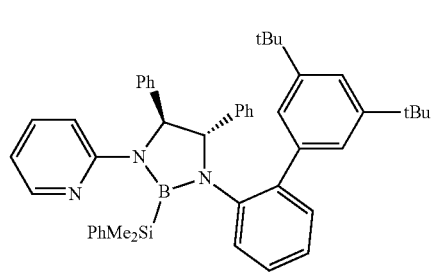
6g

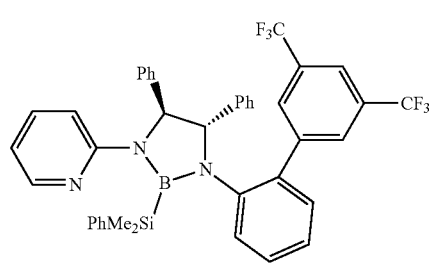
6h

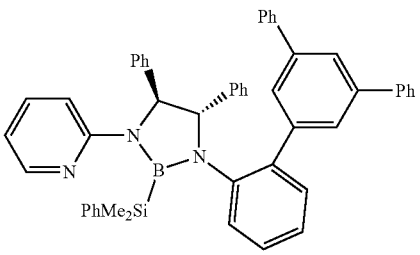
6i

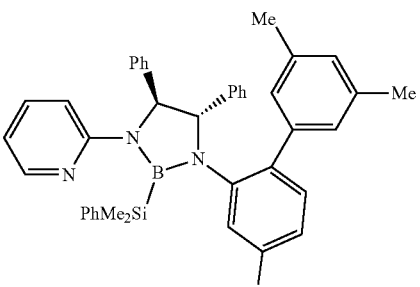
6j

Upon detection, the compound of formula 6b obtained in this example was 420 mg of a white solid with a yield of 70%, and its NMR data was: $^1$H NMR (400 MHz, CDCl$_3$) δ 8.07 (d, J=3.2 Hz, 1H), 7.71 (d, J=6.4 Hz, 2H), 7.30-6.85 (m, 20H), 6.77 (d, J=7.6 Hz, 2H), 6.68-6.60 (m, 1H), 6.03 (d, J=8.2 Hz, 1H), 4.78 (s, 1H), 3.99 (s, 1H), 2.20 (s, 3H), 0.32 (s, 3H), 0.22 (s, 3H); $^{13}$C NMR (100 MHz, CDCl$_3$) δ 156.6, 147.7, 147.3, 142.8, 142.4, 142.3, 140.8, 138.0, 137.1, 136.8, 136.1, 134.3, 131.4, 130.4, 129.6, 129.2, 128.7, 128.5, 128.4, 127.9, 127.7, 127.5, 127.1, 126.8, 126.7, 125.9, 125.4, 115.5, 109.0, 75.3, 70.3, 21.1, −0.6, −1.1; HRMS (ESI) calcd for C$_{40}$H$_{39}$BN$_3$Si ([M+H]$^+$) 600.3001, found 600.3003.

Upon detection, the compound of formula 6c obtained in this example was 450 mg of a yellow solid with a yield of 73%, and its NMR data was: $^1$H NMR (400 MHz, CDCl$_3$) δ 7.98 (d, J=4.0 Hz, 1H), 7.68 (d, J=7.2 Hz, 2H), 7.30-6.82 (m, 20H), 6.69 (s, 1H), 6.61-6.54 (m, 1H), 5.99 (d, J=8.4 Hz, 1H), 4.80 (d, J=3.2 Hz, 1H), 4.15 (d, J=3.6 Hz, 1H), 2.20 (s, 6H), 0.29 (s, 3H), 0.22 (s, 3H); $^{13}$C NMR (100 MHz, CDCl$_3$) δ 156.5, 147.1, 142.9, 142.8, 142.5, 140.8, 140.0, 139.5, 137.2, 136.9, 134.0, 131.6, 130.4, 128.6, 128.5, 128.4, 127.5, 127.4, 127.1, 126.8, 126.3, 125.8, 125.1, 115.4, 108.8, 76.3, 70.5, 21.4, −0.5, −0.7; HRMS (ESI) calcd for C$_{41}$H$_{41}$BN$_3$Si ([M+H]$^+$) 614.3163, found 614.6164.

Upon detection, the compound of formula 6d obtained in this example was 426 mg of a yellow solid with a yield of 66%, and its NMR data was: $^1$H NMR (400 MHz, CDCl$_3$) δ 8.02 (d, J=3.2 Hz, 1H), 7.71 (dd, J=7.6, 1.6 Hz, 2H), 7.33-7.12 (m, 10H), 7.10-6.93 (m, 7H), 6.89 (d, J=7.6 Hz, 1H), 6.61 (dd, J=6.8, 5.2 Hz, 1H), 6.36 (d, J=2.4 Hz, 2H), 6.12 (t, J=2.0 Hz, 1H), 6.04 (d, J=8.0 Hz, 1H), 4.79 (d, J=2.8 Hz, 1H), 4.20 (d, J=2.8 Hz, 1H), 3.71 (s, 6H), 0.33 (s, 3H), 0.17 (s, 3H); $^{13}$C NMR (100 MHz, CDCl$_3$) δ 160.1, 156.6, 147.2, 142.8, 142.6, 142.4, 142.0, 140.7, 138.8, 137.1, 134.2, 131.6, 130.3, 128.6, 128.5, 128.3, 127.7, 127.6, 127.5, 127.4, 127.3, 127.1, 126.9, 126.8, 125.8, 125.0, 115.6, 109.0, 107.1, 106.8, 98.7, 76.0, 70.7, 55.1, −0.5, −0.8; HRMS (ESI) calcd for C$_{41}$H$_{41}$BN$_3$O$_2$Si ([M+H]$^+$) 646.3061, found 646.3056.

Upon detection, the compound of formula 6e obtained in this example was 482 mg of a yellow solid with a yield of 75%, and its NMR data was: $^1$H NMR (400 MHz, CDCl$_3$) 6.97 (d, J=5.2 Hz, 1H), 7.68 (d, J=7.2 Hz, 2H), 7.25-6.99 (m, 15H), 6.93-6.82 (m, 5H), 6.74 (s, 1H), 6.60-6.55 (m, 1H), 5.99 (d, J=8.0 Hz, 1H), 4.78 (d, J=3.2 Hz, 1H), 4.16 (d, J=3.2 Hz, 1H), 2.59-2.43 (m, 4H), 1.17 (t, J=7.6 Hz, 6H), 0.31 (s, 3H), 0.22 (s, 3H); $^{13}$C NMR (100 MHz, CDCl$_3$) δ 156.4, 147.0, 144.7, 143.5, 142.8, 142.7, 142.4, 140.8, 140.1, 139.7, 136.9, 134.6, 134.2, 134.0, 131.5, 130.4, 128.4, 128.2, 128.0, 127.7, 127.5, 127.4, 127.3, 127.0, 126.7, 126.2, 126.0, 125.7, 125.4, 125.0, 115.3, 108.9, 76.2, 70.6, 28.7, 15.5, −0.6, −0.7. HRMS (ESI) calcd for C$_{43}$H$_{44}$BN$_3$Si ([M+H]$^+$) 642.3470, found 642.3480.

Upon detection, the compound of formula 6f obtained in this example was 435 mg of a yellow solid with a yield of 65%, and its NMR data was: $^1$H NMR (400 MHz, CDCl$_3$) δ 7.94 (d, J=4.4 Hz, 1H), 7.67 (dd, J=7.6, 1.2 Hz, 2H), 7.29-6.97 (m, 16H), 6.94-6.87 (m, 3H), 6.82 (d, J=6.8 Hz, 2H), 6.56 (dd, J=7.2, 5.2 Hz, 1H), 6.00 (d, J=8.4 Hz, 1H), 4.77 (d, J=4.2 Hz, 1H), 4.23 (d, J=4.2 Hz, 1H), 2.87-2.72 (m, 2H), 1.21 (d, J=6.8 Hz, 6H), 1.18 (d, J=6.8 Hz, 6H), 0.32 (s, 3H), 0.17 (s, 3H); $^{13}$C NMR (100 MHz, CDCl$_3$) δ 156.5, 147.9, 147.0, 143.0, 142.8, 142.3, 140.9, 140.3, 136.9, 134.0, 131.8, 130.6, 128.6, 128.4, 128.2, 128.1, 127.6, 127.5, 127.3, 127.2, 127.0, 126.8, 125.7, 125.2, 124.3, 123.3, 115.4, 109.1, 76.6, 71.2, 33.9, 24.3, 23.9, −0.3, −0.4; HRMS (ESI) calcd for C$_{45}$H$_{49}$BN$_3$Si ([M+H]$^+$) 670.3789, found 670.3797.

Upon detection, the compound of formula 6g obtained in this example was 489 mg of a yellow solid with a yield of 70%, and its NMR data was: $^1$H NMR (400 MHz, CDCl$_3$) δ 7.92 (d, J=4.1 Hz, 1H), 7.66 (d, J=6.2 Hz, 2H), 7.26-6.96 (m, 18H), 6.92 (d, J=7.6 Hz, 1H), 6.81 (d, J=6.4 Hz, 2H), 6.60-6.51 (m, 1H), 6.02 (d, J=8.4 Hz, 1H), 4.77 (d, J=4.2 Hz, 1H), 4.35 (d, J=4.2 Hz, 1H), 1.27 (s, 18H), 0.31 (s, 3H), 0.15 (s, 3H); $^{13}$C NMR (100 MHz, CDCl$_3$) δ 156.6, 149.9, 147.0, 143.0, 142.9, 142.2, 141.0, 140.9, 140.0, 136.9, 134.1, 131.9, 130.8, 128.7, 128.4, 127.5, 127.4, 127.4, 127.1, 127.0, 126.9, 125.6, 125.4, 123.1, 120.7, 115.5, 109.3, 76.6, 71.5, 31.5, −0.2, −0.5; HRMS (ESI) calcd for C$_{47}$H$_{53}$BN$_3$Si ([M+H]$^+$) 698.4102, found 698.4107.

Upon detection, the compound of formula 6h obtained in this example was 362 mg of a yellow solid with a yield of 50%, and its NMR data was: $^1$H NMR (400 MHz, CDCl$_3$) δ 8.05 (d, J=4.4 Hz, 1H), 7.59 (d, J=6.8 Hz, 2H), 7.52 (d, J=8.0 Hz, 3H), 7.25-7.01 (m, 15H), 6.91 (dd, J=19.6, 14.8 Hz, 4H), 6.65 (dd, J=7.2, 5.2 Hz, 1H), 5.99 (d, J=8.0 Hz, 1H), 4.77 (s, 1H), 3.85 (s, 1H), 0.42 (s, 3H), 0.25 (s, 3H); $^{13}$C NMR (100 MHz, CDCl$_3$) δ 156.3, 147.3, 142.2, 142.1, 141.7, 140.9, 137.2, 136.7, 134.0, 132.0, 130.5 (q, J$_{CF}$=30.0 Hz), 130.0, 129.8, 128.8, 128.4, 127.9, 127.6, 127.5, 127.1, 127.0, 126.7, 126.3, 124.5, 123.2 (q, J$_{CF}$=270.7 Hz), 120.6, 115.9, 109.1, 77.6, 70.3, −1.0, −1.1; HRMS (ESI) calcd for C$_{41}$H$_{35}$BF$_6$N$_3$Si ([M+H]$^+$) 722.2597, found 722.2596.

Upon detection, the compound of formula 6i obtained in this example was 458 mg of a yellow solid with a yield of 70%, and its NMR data was: $^1$H NMR (400 MHz, CDCl$_3$) δ 7.99 (d, J=2.4 Hz, 1H), 7.70-7.58 (m, 7H), 7.53-7.46 (m, 6H), 7.43-7.36 (m, 3H), 7.23-7.08 (m, 9H), 7.05 (d, J=6.8 Hz, 3H), 6.96 (s, 2H), 6.80 (s, 3H), 6.62-6.54 (m, 1H), 5.95 (d, J=7.1 Hz, 1H), 4.80 (s, 1H), 4.27 (s, 1H), 0.35 (s, 3H), 0.28 (s, 3H); $^{13}$C NMR (100 MHz, CDCl$_3$) δ 156.5, 147.1, 142.6, 142.5, 142.3, 142.2, 141.3, 141.0, 140.6, 139.0, 137.0, 134.1, 131.8, 130.6, 128.8, 128.6, 128.5, 127.6, 127.4, 127.4, 127.2, 127.1, 126.8, 126.2, 126.0, 124.8, 124.4, 115.6, 109.1, 76.7, 70.8, −0.4, −0.7; HRMS (ESI) calcd for C$_{51}$H$_{45}$BN$_3$Si ([M+H]$^+$) 738.3476, found 738.3475.

Upon detection, the compound of formula 6j obtained in this example was 434 mg of a white solid with a yield of 69%, and its NMR data was: $^1$H NMR (400 MHz, CDCl$_3$) δ 8.03 (d, J=2.8 Hz, 1H), 7.69 (d, J=6.4 Hz, 2H), 7.26-7.09 (m, 9H), 7.03 (d, J=6.0 Hz, 2H), 6.97-6.76 (m, 7H), 6.67 (s, 2H), 6.58 (s, 1H), 5.99 (d, J=8.4 Hz, 1H), 4.77 (s, 1H), 4.16 (s, 1H), 2.18 (s, 6H), 2.10 (s, 3H), 0.32 (s, 3H), 0.25 (s, 3H); $^{13}$C NMR (100 MHz, CDCl$_3$) δ 156.6, 147.7, 147.3, 142.8, 142.4, 142.3, 140.8, 138.0, 137.1, 136.8, 136.1, 134.3, 131.4, 130.4, 129.6, 129.2, 128.7, 128.5, 128.4, 127.9, 127.7, 127.5, 127.1, 126.8, 126.7, 125.9, 125.4, 115.5, 109.0, 75.3, 70.3, 21.1, 20.7, −0.6, −1.1; HRMS (ESI) calcd for C$_{42}$H$_{43}$BN$_3$O$_2$Si ([M+H]$^+$) 628.3319, found 628.3320.

Example 7

In this example, catalysts were prepared from different boron-nitrogen ligands (S,S)-6 and various metal precursors, and then used in asymmetric C—H bond boronization reactions to prepare a chiral compound 8a.

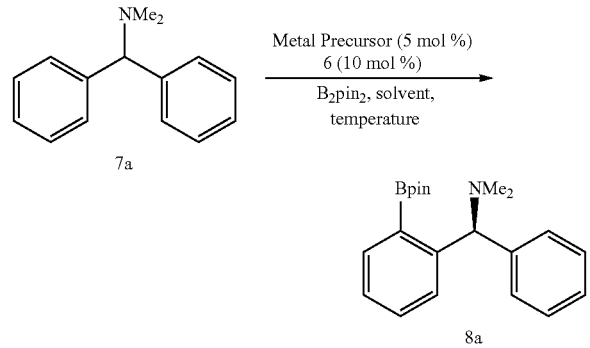

The reaction steps were as follows: into a 25 mL dry Schlenk tube added were ligands 6a-6j (0.01 mmol), metal precursors (0.005 mmol), 7a (21.2 mg, 0.10 mmol), B$_2$pin$_2$ (25.4 mg, 0.10 mmol), and 1.0 mL of a solvent. The mixture was reacted under heating, and then cooled to room temperature. The solvent was removed by rotary evaporation, and the residue was separated by column chromatography with silica gel (petroleum ether/ethyl acetate=10:1), so as to obtain the boronized product 8a. The results of asymmetric boronization of the substrate 7a under different reaction conditions to prepare (S)-8a were as shown in Table 1.

TABLE 1

Results of Asymmetric Boronization

| Entry | Metal precursor | Ligand | Solvent | Temperature (° C.) | Yield (%) | ee (%) |
|---|---|---|---|---|---|---|
| 1 | [Ir(COD)Cl]$_2$ | 6a | THF | 80 | 58 | 19 |
| 2 | [Ir(COD)Cl]$_2$ | none | THF | 80 | trace | — |
| 3 | [Ir(COD)Cl]$_2$ | dtbpy | THF | 80 | — | — |
| 4 | [Ir(COD)Cl]$_2$ | 6b | THF | 80 | 67 | 13 |
| 5 | [Ir(COD)Cl]$_2$ | 6c | THF | 80 | 95 | 90 |
| 6 | [Ir(COD)Cl]$_2$ | 6d | THF | 80 | 90 | 47 |
| 7 | [Ir(COD)Cl]$_2$ | 6e | THF | 80 | 99 | 77 |
| 8 | [Ir(COD)Cl]$_2$ | 6f | THF | 80 | 93 | 83 |
| 9 | [Ir(COD)Cl]$_2$ | 6g | THF | 80 | 81 | 87 |
| 10 | [Ir(COD)Cl]$_2$ | 6h | THF | 80 | 90 | 85 |
| 11 | [Ir(COD)Cl]$_2$ | 6i | THF | 80 | 88 | 56 |
| 12 | [Ir(COD)Cl]$_2$ | 6j | THF | 80 | 98 | 89 |
| 13 | [Ir(COD)Cl]$_2$ | 6c | dioxane | 80 | 90 | 74 |
| 14 | [Ir(COD)Cl]$_2$ | 6c | hexane | 80 | 87 | 74 |

TABLE 1-continued

Results of Asymmetric Boronization

| Entry | Metal precursor | Ligand | Solvent | Temperature (° C.) | Yield (%) | ee (%) |
|---|---|---|---|---|---|---|
| 15 | [Ir(COD)Cl]$_2$ | 6c | THF | 70 | 98 (88)* | 94 |
| 16 | [IrOMe(COD)]$_2$ | 6c | THF | 70 | 72 | 90 |

*The separation yield was shown in parentheses, and the rest was nuclear magnetic yield.

Example 8-1

In this example, the operation steps of the method for preparing the compound of formula (S)-8a was as follows, and the reaction route was as shown below.

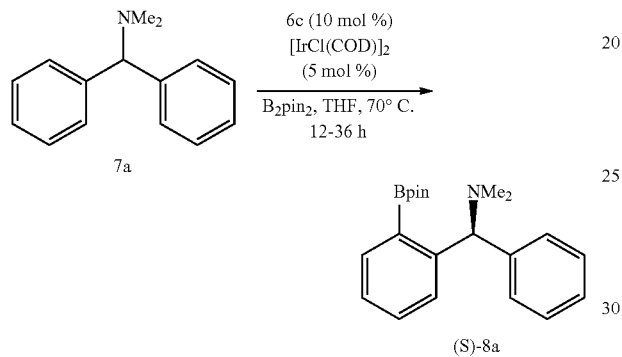

In a glove box, into a 25 mL dry Schlenk tube added were the ligand 6c (6.2 mg, 0.01 mmol), [IrCl(COD)]$_2$ (3.3 mg, 0.005 mmol), a compound 7a (21.2 mg, 0.10 mmol), B$_2$pin$_2$ (25.4 mg, 0.10 mmol), and 1.0 mL of THF. The mixture was reacted at 70° C. for 12 hours, and then cooled to room temperature. The solvent was removed by rotary evaporation, and the residue was separated by column chromatography with silica gel (petroleum ether/ethyl acetate=10:1), so as to obtain the boronized product 8a.

Upon detection, the compound of formula 8a obtained in this example was 29.7 mg of a white oily liquid with a yield of 88% and 94% ee (enantiomeric excess percentage), $[\alpha]_D^{25}=-96.6$ (c 0.94, CHCl$_3$). The NMR data of the compound of formula 8a was: $^1$H NMR (400 MHz, CDCl$_3$) δ 7.61 (d, J=7.2 Hz, 1H), 7.46-7.40 (m, 3H), 7.34-7.23 (m, 3H), 7.14 (t, J=7.2 Hz, 1H), 6.77 (d, J=7.6 Hz, 1H), 5.23 (s, 1H), 2.34 (s, 6H), 1.36 (s, 6H), 1.32 (s, 6H); $^{13}$C NMR (100 MHz, CDCl$_3$) δ 141.7, 132.5, 132.3, 130.5, 129.2, 128.3, 127.5, 127.0, 124.0, 80.2, 75.0, 41.1, 27.4, 26.3; HRMS (ESI) calcd for C$_{21}$H$_{29}$BNO$_2$ ([M+H]$^+$) 338.2286, found 338.2299.

Example 8-2

This example was basically the same as Example 8-1, except that the molar ratio of the catalyst to the compound of formula 7a was 0.001:1, the temperature of the reaction was 40° C., and the time of the reaction was 72 h.

Example 8-3

This example was basically the same as Example 8-1, except that the molar ratio of the catalyst to the compound of formula 7a was 0.02:1, the temperature of the reaction was 100° C., and the time of the reaction was 2 h.

Example 9

With reference to the preparation method of Example 8, compounds of formulas 8b-8z were prepared, and their structures were respectively as shown in the formulas below:

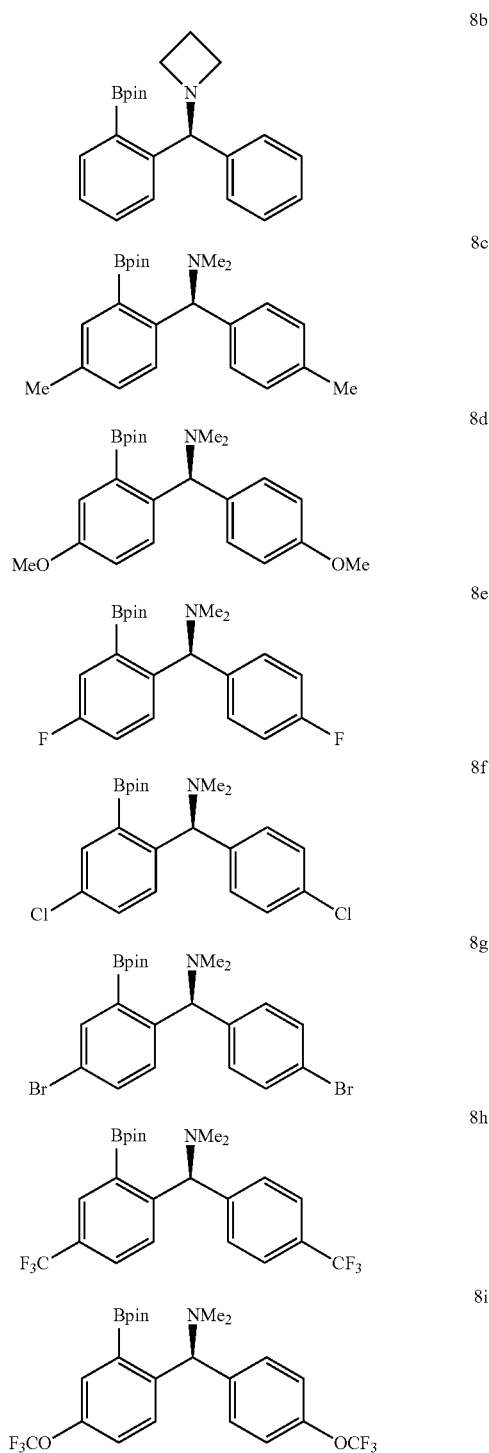

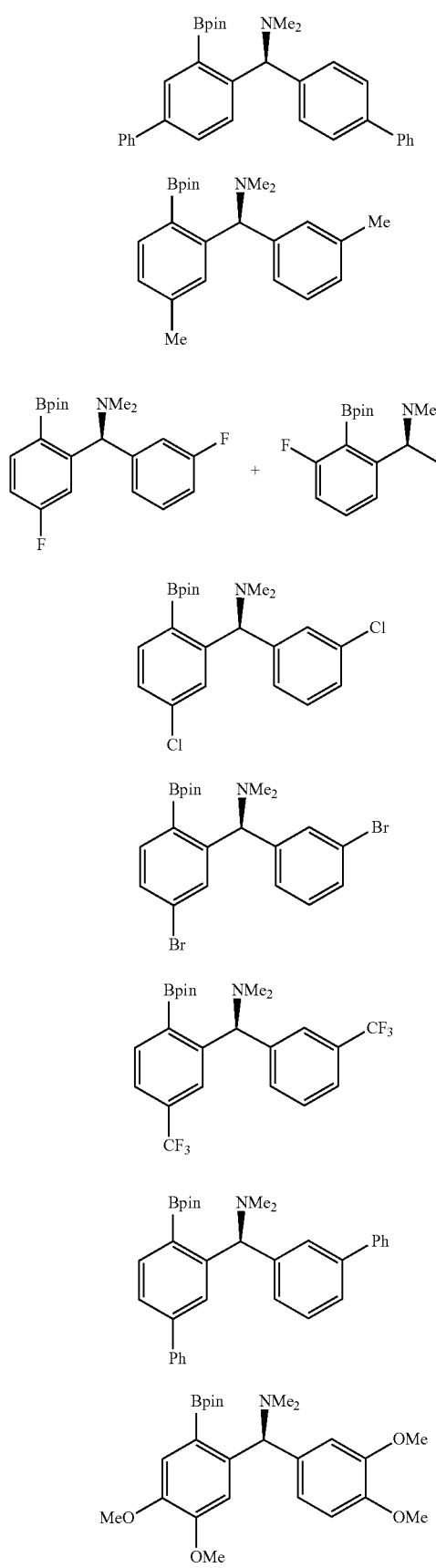

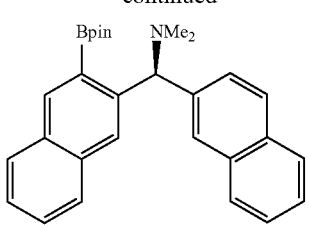
8z

Upon detection, the compound of formula 8b obtained in this example was 20.9 mg of a yellow oily liquid with a yield of 60% and 86% ee, $[\alpha]_D^{25}$=−11.6 (c 0.76, CHCl$_3$). The NMR data of the compound of formula 8b was: $^1$H NMR (400 MHz, CDCl$_3$) δ 7.62 (d, J=7.2 Hz, 1H), 7.47-7.40 (m, 5H), 7.24 (t, J=7.2 Hz, 1H), 7.13 (t, J=7.2 Hz, 1H), 6.83 (d, J=7.6 Hz, 1H), 5.15 (s, 1H), 3.75-3.58 (m, 4H), 1.99-1.90 (m, 2H), 1.40 (s, 6H), 1.38 (s, 6H); $^{13}$C NMR (100 MHz, CDCl$_3$) δ 142.0, 135.0, 131.8, 130.9, 129.0, 128.5, 127.4, 127.3, 124.0, 80.2, 74.4, 48.9, 27.1, 26.5, 15.3; HRMS (ESI) calcd for C$_{22}$H$_{29}$BNO$_2$ ([M+H]$^+$) 350.2286, found 350.2299.

Upon detection, the compound of formula 8c obtained in this example was 25.6 mg of a yellow oily liquid with a yield of 70% and 88% ee, $[\alpha]_D^{25}$=−57.4 (c 0.85, CHCl$_3$). The NMR data of the compound of formula 8c was: $^1$H NMR (400 MHz, CDCl$_3$) δ 7.45 (s, 1H), 7.27 (d, J=7.6 Hz, 2H), 7.22 (d, J=7.6 Hz, 2H), 6.99 (d, J=7.6 Hz, 1H), 6.71 (d, J=7.6 Hz, 1H), 5.20 (s, 1H), 2.44 (s, 3H), 2.39 (s, 3H), 2.35 (s, 6H), 1.40 (s, 6H), 1.36 (s, 6H); $^{13}$C NMR (100 MHz, CDCl$_3$) δ 139.0, 139.0, 136.6, 132.1, 131.1, 129.5, 128.9, 127.6, 123.8, 80.0, 74.5, 40.9, 27.4, 26.3, 21.3, 21.1; HRMS (ESI) calcd for C$_{23}$H$_{33}$BNO$_2$ ([M+H]$^+$) 366.2599, found 366.2605.

Upon detection, the compound of formula 8d obtained in this example was 30.2 mg of a yellow oily liquid with a yield of 76% and 85% ee, $[\alpha]_D^{25}$=−46.7 (c 0.94, CHCl$_3$). The NMR data of the compound of formula 8d was: $^1$H NMR (400 MHz, CDCl$_3$) δ 7.21 (d, J=7.6 Hz, 2H), 7.14 (s, 1H), 6.95 (d, J=8.4 Hz, 2H), 6.69 (s, 2H), 5.15 (s, 1H), 3.85 (s, 3H), 3.82 (s, 3H), 2.30 (s, 6H), 1.35 (s, 6H), 1.31 (s, 6H). $^{13}$C NMR (100 MHz, CDCl$_3$) δ 160.3, 159.3, 134.1, 133.4, 125.0, 124.5, 114.9, 113.7, 113.2, 80.1, 74.5, 55.3, 55.2, 40.7, 27.4, 26.4; HRMS (ESI) calcd for C$_{23}$H$_{33}$BNO$_2$ ([M+H]$^+$) 398.2497, found 398.2500.

Upon detection, the compound of formula 8e obtained in this example was 30.6 mg of a yellow oily liquid with a yield of 82% and 90% ee, $[\alpha]_D^{25}$=−70.3 (c 0.93, CHCl$_3$). The NMR data of the compound of formula 8e was: $^1$H NMR (400 MHz, CDCl$_3$) δ 7.33-7.27 (m, 3H), 7.18 (t, J=8.4 Hz, 2H), 6.86 (td, J=8.4, 2.0 Hz, 1H), 6.78-6.71 (m, 1H), 5.21 (s, 1H), 2.36 (s, 6H), 1.38 (s, 6H), 1.34 (s, 6H); $^{13}$C NMR (101 MHz, CDCl$_3$) δ 163.3 (d, J$_{CF}$=248 Hz), 163.0 (d, J$_{CF}$=245 Hz), 136.7, 133.8 (d, J$_{CF}$=8 Hz), 128.1 (d, J$_{CF}$=3 Hz), 125.4 (d, J$_{CF}$=8 Hz), 116.8 (d, J$_{CF}$=19 Hz), 115.6 (d, J$_{CF}$=21 Hz), 114.0 (d, J$_{CF}$=23 Hz), 80.4, 73.8, 41.1, 27.3, 26.4; HRMS (ESI) calcd for C$_{21}$H$_{27}$BF$_2$NO$_2$ ([M+H]$^+$) 374.2097, found 374.2102.

Upon detection, the compound of formula 8f obtained in this example was 38.6 mg of a yellow oily liquid with a yield of 95% and 88% ee, $[\alpha]_D^{25}$=−37.3 (c 1.30, CHCl$_3$). The NMR data of the compound of formula 8f was: $^1$H NMR (400 MHz, CDCl$_3$) δ 7.55 (s, 1H), 7.43 (d, J=8.4 Hz, 2H), 7.21 (d, J=8.4 Hz, 2H), 7.13 (d, J=9.6 Hz, 2H), 6.69 (d, J=8.4 Hz, 1H), 5.13 (s, 1H), 2.32 (s, 6H), 1.35 (s, 6H), 1.30 (s, 6H); $^{13}$C NMR (100 MHz, CDCl$_3$) δ 139.6, 135.7, 133.9, 133.3, 130.7, 130.6, 128.8, 127.3, 125.3, 80.5, 73.8, 41.2, 27.4, 26.4; HRMS (ESI) calcd for C$_{21}$H$_{27}$BCl$_2$NO$_2$ ([M+H]$^+$) 406.1506, found 406.1513.

Upon detection, the compound of formula 8g obtained in this example was 32.7 mg of a yellow oily liquid with a yield of 66% and 82% ee, $[\alpha]_D^{25}$=−39.2 (c 0.83, CHCl$_3$). The NMR data of the compound of formula 8g was: $^1$H NMR (400 MHz, CDCl$_3$) δ 7.70 (s, 1H), 7.58 (d, J=8.0 Hz, 2H), 7.29 (s, 1H), 7.15 (d, J=8.0 Hz, 2H), 6.63 (d, J=8.0 Hz, 1H), 5.09 (s, 1H), 2.32 (s, 6H), 1.34 (s, 6H), 1.30 (s, 6H); $^{13}$C NMR (100 MHz, CDCl$_3$) δ 140.1, 133.6, 133.5, 131.8, 131.2, 130.2, 125.7, 123.9, 122.6, 80.5, 74.0, 41.3, 27.3, 26.4; HRMS (ESI) calcd for C$_{15}$H$_{15}$BBr$_2$NO$_2$ ([M+H]$^+$) 496.0476, found 496.0479.

Upon detection, the compound of formula 8h obtained in this example was 30.7 mg of a yellow oily liquid with a yield of 65% and 95% ee, $[\alpha]_D^{25}$=−59.7 (c 0.93, CHCl$_3$). The NMR data of the compound of formula 8h was: $^1$H NMR (400 MHz, CDCl$_3$) δ 7.86 (s, 1H), 7.72 (d, J=8.0 Hz, 2H), 7.44 (d, J=8.0 Hz, 3H), 6.87 (d, J=8.0 Hz, 1H), 5.26 (s, 1H), 2.37 (s, 6H), 1.37 (s, 6H), 1.32 (s, 6H); $^{13}$C NMR (100 MHz, CDCl$_3$) δ 145.1, 136.5, 132.3, 131.7 (q, J$_{CF}$=33 Hz), 130.0 (q, J$_{CF}$=31 Hz), 127.8 (q, J$_{CF}$=4 Hz), 125.6 (q, J$_{CF}$=4 Hz), 124.6 (q, J$_{CF}$=271 Hz), 124.5 (q, J$_{CF}$=4 Hz), 124.2, 123.8 (q, J$_{CF}$=271 Hz), 80.8, 74.2, 41.7, 27.2, 26.4; HRMS (ESI) calcd for C$_{23}$H$_{27}$BF$_6$NO$_2$ ([M+H]$^+$) 474.2034, found 474.2033.

Upon detection, the compound of formula 8i obtained in this example was 43.3 mg of a yellow oily liquid with a yield of 86% and 82% ee, $[\alpha]_D^{25}$=−43.4 (c 0.85, CHCl$_3$). The NMR data of the compound of formula 8i was: $^1$H NMR (400 MHz, CDCl$_3$) δ 7.43 (s, 1H), 7.32 (q, J=8.8 Hz, 4H), 7.00 (d, J=8.4 Hz, 1H), 6.78 (d, J=8.4 Hz, 1H), 5.20 (s, 1H), 2.35 (s, 6H), 1.35 (s, 6H), 1.31 (s, 6H); $^{13}$C NMR (100 MHz, CDCl$_3$) δ 150.1, 149.3, 139.6, 133.5, 130.8, 125.2, 122.9, 120.8, 120.6 (q, J$_{CF}$=255 Hz), 120.4 (q, J$_{CF}$=257 Hz), 119.9, 80.6, 73.7, 41.3, 27.3, 26.3; HRMS (ESI) calcd for C$_{23}$H$_{27}$BF$_6$NO$_4$ ([M+H]$^+$) 506.1932, found 506.1937.

Upon detection, the compound of formula 8j obtained in this example was 38.6 mg of a yellow oily liquid with a yield of 79% and 90% ee, $[\alpha]_D^{25}$=−41.8 (c 1.30, CHCl$_3$). The NMR data of the compound of formula 8j was: $^1$H NMR (400 MHz, CDCl$_3$) δ 7.82 (s, 1H), 7.70-7.60 (m, 6H), 7.50-7.37 (m, 8H), 7.31 (t, J=7.4 Hz, 1H), 6.91 (d, J=7.7 Hz, 1H), 5.31 (s, 1H), 2.42 (s, 6H), 1.38 (s, 6H), 1.34 (s, 6H); $^{13}$C NMR (100 MHz, CDCl$_3$) δ 142.3, 142.1, 141.0, 140.5, 140.3, 132.7, 131.5, 129.5, 128.9, 128.5, 127.7, 127.3, 127.1, 127.0, 126.7, 126.4, 124.4, 80.3, 74.6, 41.2, 27.4, 26.4; HRMS (ESI) calcd for C$_{33}$H$_{37}$BNO$_2$ ([M+H]$^+$) 490.2912, found 490.2915.

Upon detection, the compound of formula 8k obtained in this example was 25.6 mg of a yellow oily liquid with a yield of 70% and 81% ee, $[\alpha]_D^{25}$=−77.7 (c 0.76, CHCl$_3$). The NMR data of the compound of formula 8k was: $^1$H NMR (400 MHz, CDCl$_3$) δ 7.49 (d, J=7.2 Hz, 1H), 7.31 (t, J=7.6 Hz, 1H), 7.25 (d, J=8.0 Hz, 1H), 7.12-7.05 (m, 3H), 6.60 (s, 1H), 5.15 (s, 1H), 2.39 (s, 3H), 2.32 (s, 6H), 2.23 (s, 3H), 1.34 (s, 6H), 1.30 (s, 6H); $^{13}$C NMR (100 MHz, CDCl$_3$) δ 142.2, 137.9, 136.5, 132.9, 132.7, 130.4, 129.8, 129.3, 128.3, 128.1, 124.6, 80.0, 74.9, 41.2, 27.3, 26.3, 21.5, 21.4; HRMS (ESI) calcd for C$_{23}$H$_{33}$BNO$_2$ ([M+H]$^+$) 366.2599, found 366.2597.

Upon detection, the compounds of formulas 8l and 8l' (4:1) obtained in this example were 28.7 mg of a yellow oily liquid with a yield of 77%, 94% ee and 88% ee, $[\alpha]_D^{25}$=−79.6 (c 1.03, CHCl$_3$); $^1$H NMR (400 MHz, CDCl$_3$) δ 7.57

(t, J=7.2 Hz, 1H), 7.43 (t, J=7.6 Hz, 1H), 7.19-6.95 (m, 4H), 6.54 (d, J=10.0 Hz, 1H), 5.15 (s, 1H), 2.34 (s, 6H), 1.35 (s, 6H), 1.31 (s, 6H) (minor isomer); $^1$H NMR (400 MHz, CDCl$_3$) δ 7.41 (t, J=7.6 Hz), 7.19-6.95 (m, 4H), 6.90 (t, J=8.4 Hz, 1H), 6.57 (d, J=7.2 Hz, 1H), 5.13 (s, 1H), 2.36 (s, 6H), 1.37 (s, 6H), 1.35 (s, 6H) (major isomer); $^{13}$C NMR (100 MHz, CDCl$_3$) δ 165.0 (d, J$_{CF}$=242.7 Hz), 162.9 (d, J$_{CF}$=242.1 Hz), 162.6 (d, J$_{CF}$=246.1 Hz), 162.5 (d, J$_{CF}$=245.7 Hz), 144.3 (d, J$_{CF}$=11.4 Hz), 143.9 (d, J$_{CF}$ 7.3 Hz), 135.4 (d, J$_{CF}$=6.1 Hz), 134.8 (d, J$_{CF}$=6.8 Hz), 132.6 (d, J$_{CF}$=7.9 Hz), 130.0 (d, J$_{CF}$=7.8 Hz), 129.9 (d, J$_{CF}$=8.0 Hz), 129.4 (d, J$_{CF}$=7.9 Hz), 127.9, 127.5, 120.1 (d, J$_{CF}$=2.6 Hz), 118.8 (d, J$_{CF}$=21.5 Hz), 118.6 (d, J$_{CF}$=21.8 Hz), 116.5 (d, J$_{CF}$=21.1 Hz), 116.4 (d, J$_{CF}$=21.0 Hz), 114.9 (d, J$_{CF}$=25.5 Hz), 114.8 (d, J$_{CF}$=19.6 Hz), 111.2 (d, J$_{CF}$=22.0 Hz), 80.8, 80.6, 73.9, 73.8, 41.7, 41.2, 27.5, 27.2, 26.4, 26.3 (mixture); HRMS (ESI) calcd for C$_{21}$H$_{27}$BF$_2$NO$_2$ ([M+H]$^+$) 374.2097, found 374.2104.

Upon detection, the compound of formula 8m obtained in this example was [α]$_D$$^{25}$30.0 mg of a yellow oily liquid with a yield of 74% and 93% ee, [α]$_D$$^{25}$=−69.6 (c 1.02, CHCl$_3$). The NMR data of the compound of formula 8m was: $^1$H NMR (400 MHz, CDCl$_3$) δ 7.54 (d, J=8.0 Hz, 1H), 7.45 (d, J=8.0 Hz, 1H), 7.39 (t, J=8.0 Hz, 1H), 7.30 (s, 1H), 7.25 (d, J=7.6 Hz, 1H), 7.18 (d, J=7.2 Hz, 1H), 6.79 (s, 1H), 5.10 (s, 1H), 2.33 (s, 6H), 1.34 (s, 6H), 1.30 (s, 6H); $^{13}$C NMR (101 MHz, CDCl$_3$) δ 143.6, 134.7, 134.6, 133.3, 132.3, 131.8, 129.9, 129.8, 129.6, 128.0, 124.1, 80.6, 74.0, 41.6, 27.2, 26.3; HRMS (ESI) calcd for C$_{21}$H$_{27}$BCl$_{12}$NO$_2$ ([M+H]$^+$) 406.1506, found 406.1513.

Upon detection, the compound of formula 8n obtained in this example was 31.2 mg of a yellow oily liquid with a yield of 65% and 93% ee, [α]$_D$$^{25}$=−73.4 (c 1.08, CHCl$_3$). The NMR data of the compound of formula 8n was: $^1$H NMR (400 MHz, CDCl$_3$) δ 7.60 (d, J=8.0 Hz, 1H), 7.50-7.45 (m, 2H), 7.40 (d, J=7.2 Hz, 1H), 7.33 (t, J=7.6 Hz, 1H), 7.22 (d, J=7.6 Hz, 1H), 6.93 (s, 1H), 5.09 (s, 1H), 2.33 (s, 6H), 1.34 (s, 6H), 1.30 (s, 6H); $^{13}$C NMR (100 MHz, CDCl$_3$) δ 143.9, 135.0, 134.7, 132.7, 132.6, 130.8, 130.3, 130.1, 126.9, 122.7, 121.5, 80.6, 73.9, 41.6, 27.2, 26.3; HRMS (ESI) calcd for C$_{21}$H$_{27}$BBr$_2$NO$_2$ ([M+H]$^+$) 496.0476, found 496.0480.

Upon detection, the compound of formula 8o obtained in this example was 42.6 mg of a yellow oily liquid with a yield of 90% and 96% ee, [α]$_D$$^{25}$=−63.7 (c 1.23, CHCl$_3$). The NMR data of the compound of formula 8o was: $^1$H NMR (400 MHz, CDCl$_3$) δ 7.75 (d, J=7.6 Hz, 2H), 7.64-7.53 (m, 3H), 7.48 (d, J=7.6 Hz, 1H), 7.01 (s, 1H), 5.24 (s, 1H), 2.36 (s, 6H), 1.36 (s, 6H), 1.31 (s, 6H); $^{13}$C NMR (100 MHz, CDCl$_3$) δ 142.0, 134.8, 133.6, 131.4, 131.3 (q, J$_{CF}$=32 Hz), 129.9 (q, J$_{CF}$=32 Hz), 129.2, 128.7 (q, J$_{CF}$=3 Hz), 126.5 (q, J$_{CF}$=3 Hz), 124.7 (q, J$_{CF}$=3 Hz), 124.4 (q, J$_{CF}$=270 Hz), 123.7 (q, J$_{CF}$=270 Hz), 120.5 (q, J$_{CF}$=3 Hz), 80.8, 74.3, 41.6, 27.2, 26.4; HRMS (ESI) calcd for C$_{23}$H$_{26}$BF$_6$NO$_2$ ([M+Na]$^+$) 496.1853, found 496.1855.

Upon detection, the compound of formula 8p obtained in this example was 39.1 mg of a yellow oily liquid with a yield of 80% and 92% ee, [α]$_D$$^{25}$=−72.7 (c 1.10, CHCl$_3$). The NMR data of the compound of formula 8p was: $^1$H NMR (400 MHz, CDCl$_3$) δ 7.69 (t, J=7.6 Hz, 2H), 7.59 (d, J=6.4 Hz, 3H), 7.54-7.42 (m, 6H), 7.39-7.29 (m, 4H), 7.25 (t, J=7.2 Hz, 1H), 7.09 (s, 1H), 5.31 (s, 1H), 2.41 (s, 6H), 1.38 (s, 6H), 1.34 (s, 6H); $^{13}$C NMR (101 MHz, CDCl$_3$) δ 142.6, 141.7, 141.4, 140.4, 140.2, 133.5, 131.1, 131.0, 130.7, 128.9, 128.8, 128.5, 128.0, 127.6, 127.2, 127.1, 126.8, 126.7, 122.8, 80.3, 75.4, 41.6, 27.3, 26.4; HRMS (ESI) calcd for C$_{33}$H$_{37}$BNO$_2$ ([M+H]$^+$) 490.2912, found 490.2921.

Upon detection, the compound of formula 8q obtained in this example was 32.0 mg of a yellow oily liquid with a yield of 70% and 87% ee, [α]$_D$$^{25}$=−41.4 (c 0.72, CHCl$_3$). The NMR data of the compound of formula 8q was: $^1$H NMR (400 MHz, CDCl$_3$) δ 7.10 (s, 1H), 6.91 (s, 2H), 6.82 (s, 1H), 6.38 (s, 1H), 5.07 (s, 1H), 3.93 (s, 6H), 3.81 (s, 3H), 3.70 (s, 3H), 2.34 (s, 6H), 1.34 (s, 6H), 1.31 (s, 6H); $^{13}$C NMR (100 MHz, CDCl$_3$) δ 149.7, 148.7, 148.6, 134.4, 126.0, 124.7, 114.5, 112.8, 110.5, 107.8, 80.1, 75.2, 56.0, 55.9, 55.8, 41.8, 27.2, 26.4; HRMS (ESI) calcd for C$_{25}$H$_{37}$BNO$_6$ ([M+H]$^+$) 458.2708, found 458.2708.

Upon detection, the compound of formula 8r obtained in this example was 25.9 mg of a yellow oily liquid with a yield of 61% and 82% ee, [α]$_D$$^{25}$=−49.9 (c 0.87, CHCl$_3$). The NMR data of the compound of formula 8r was: $^1$H NMR (400 MHz, CDCl$_3$) δ 6.86 (d, J=8.0 Hz, 1H), 6.80 (dd, J=8.0, 1.2 Hz, 1H), 6.74 (s, 1H), 6.60 (d, J=8.0 Hz, 1H), 6.28 (d, J=8.0 Hz, 1H), 6.01 (d, J=3.2 Hz, 2H), 5.98 (s, 2H), 5.05 (s, 1H), 2.32 (s, 6H), 1.33 (s, 12H); $^{13}$C NMR (100 MHz, CDCl$_3$) δ 148.6, 148.4, 147.6, 146.6, 136.3, 126.5, 125.9, 117.5, 111.8, 108.0, 106.9, 101.4, 100.4, 80.4, 74.7, 40.8, 27.3, 26.0; HRMS (ESI) calcd for C$_{23}$H$_{29}$BNO$_6$ ([M+H]$^+$) 426.2082, found 426.2088.

Upon detection, the compound of formula 8s obtained in this example was 39.4 mg of a yellow oily liquid with a yield of 83% and 88% ee, [α]$_D$$^{25}$=−50.4 (c 1.30, CHCl$_3$). The NMR data of the compound of formula 8s was: $^1$H NMR (400 MHz, CDCl$_3$) δ 7.64 (s, 1H), 7.53 (d, J=8.4 Hz, 1H), 7.41 (d, J=2.0 Hz, 1H), 7.12 (dd, J=8.4, 2.0 Hz, 1H), 6.89 (s, 1H), 5.02 (s, 1H), 2.33 (s, 6H), 1.34 (s, 6H), 1.30 (s, 6H); $^{13}$C NMR (100 MHz, CDCl$_3$) δ 141.5, 134.1, 133.4, 133.1, 133.0, 132.9, 132.2, 131.4, 130.7, 130.6, 126.0, 80.9, 73.1, 41.8, 27.1, 26.4; HRMS (ESI) calcd for C$_{21}$H$_{25}$BCl$_{14}$NO$_2$ ([M+H]$^+$) 476.0698, found 476.0706.

Upon detection, the compound of formula 8t obtained in this example was 35.4 mg of a yellow oily liquid with a yield of 76% and 86% ee, [α]$_D$$^{25}$=−42.0 (c 0.99, CHCl$_3$). The NMR data of the compound of formula 8t was: $^1$H NMR (400 MHz, CDCl$_3$) δ 7.56 (s, 1H), 7.40 (d, J=8.1 Hz, 1H), 6.97 (s, 1H), 6.87 (d, J=8.1 Hz, 1H), 6.44 (s, 1H), 4.98 (s, 1H), 3.85 (s, 3H), 3.73 (s, 3H), 2.34 (s, 6H), 1.33 (s, 6H), 1.30 (s, 6H); $^{13}$C NMR (100 MHz, CDCl$_3$) δ 155.0, 154.7, 142.4, 134.4, 132.8, 130.0, 124.1, 123.5, 122.3, 115.0, 108.4, 80.7, 75.2, 56.2, 56.1, 42.7, 26.9, 26.5; HRMS (ESI) calcd for C$_{23}$H$_{31}$BCl$_2$NO$_4$ ([M+H]$^+$) 466.1718, found 466.1729.

Upon detection, the compound of formula 8u obtained in this example was 39.7 mg of a yellow oily liquid with a yield of 71% and 79% ee, [α]$_D$$^{25}$=−21.2 (c 1.29, CHCl$_3$). The NMR data of the compound of formula 8u was: $^1$H NMR (400 MHz, CDCl$_3$) δ 7.72 (s, 1H), 7.57 (d, J=8.0 Hz, 1H), 6.94 (s, 1H), 6.81 (d, J=8.0 Hz, 1H), 6.42 (s, 1H), 4.95 (s, 1H), 3.84 (s, 3H), 3.73 (s, 3H), 2.34 (s, 6H), 1.32 (s, 6H), 1.30 (s, 6H); $^{13}$C NMR (101 MHz, CDCl$_3$) δ 155.9, 155.5, 143.3, 136.0, 135.3, 133.0, 124.5, 114.8, 112.7, 111.8, 108.4, 80.7, 75.2, 56.3, 56.2, 42.8, 26.8, 26.5; HRMS (ESI) calcd for C$_{23}$H$_{31}$BBr$_2$NO$_4$ ([M+H]$^+$) 556.0687, found 556.0688.

Upon detection, the compound of formula 8v obtained in this example was 31.4 mg of a yellow oily liquid with a yield of 60% and 89% ee, [α]$_D$$^{25}$=−61.4 (c 0.72, CHCl$_3$). The NMR data of the compound of formula 8v was: $^1$H NMR (400 MHz, CDCl$_3$) δ 7.47 (d, J=1.6 Hz, 1H), 7.45 (s, 1H), 7.29 (d, J=8.0 Hz, 1H), 7.11 (dd, J=8.0, 1.2 Hz, 1H), 6.96 (s, 1H), 5.05 (s, 1H), 2.45 (s, 3H), 2.39 (s, 3H), 2.31 (s, 6H), 1.34 (s, 6H), 1.30 (s, 6H); $^{13}$C NMR (100 MHz, CDCl$_3$) δ 141.4, 139.2, 136.8, 135.5, 133.3, 132.2, 130.8, 130.4, 127.7, 125.0, 123.9, 80.5, 73.3, 41.4, 27.2, 26.3, 22.8, 22.7; HRMS (ESI) calcd for $C_{23}H_{31}BBr_2NO_2$ ([M+H]$^+$) 524.0789, found 524.0788.

Upon detection, the compound of formula 8w obtained in this example was 30.9 mg of a yellow oily liquid with a yield of 77% and 85% ee, $[\alpha]_D^{25}$=−67.4 (c 0.76, CHCl$_3$). The NMR data of the compound of formula 8w was: $^1$H NMR (400 MHz, CDCl$_3$)$^1$H NMR (400 MHz, CDCl$_3$) δ 7.20 (d, J=9.2 Hz, 1H), 7.10 (d, J=7.2 Hz, 1H), 7.07 (d, J=6.8 Hz, 2H), 6.56 (d, J=6.8 Hz, 1H), 5.07 (s, 1H), 2.31 (s, 9H), 2.16 (s, 3H), 1.33 (s, 6H), 1.29 (s, 6H); $^{13}$C NMR (100 MHz, CDCl$_3$) δ 161.8 (d, $J_{CF}$=246 Hz), 161.6 (d, $J_{CF}$=243 Hz), 136.8 (d, $J_{CF}$=2 Hz), 135.1 (d, $J_{CF}$=5 Hz), 131.0 (d, $J_{CF}$=8 Hz), 128.2 (d, $J_{CF}$=4 Hz), 126.9 (d, $J_{CF}$=4 Hz), 125.1 (d, $J_{CF}$=18 Hz), 123.4 (d, $J_{CF}$=19 Hz), 116.4 (d, $J_{CF}$=21 Hz), 115.0 (d, $J_{CF}$=23 Hz), 80.2, 74.0, 41.2, 27.3, 26.4, 14.7; HRMS (ESI) calcd for $C_{23}H_{31}BF_2NO_2$ ([M+H]$^+$) 402.2410, found 402.2415.

Upon detection, the compounds of formulas 8x and 8x' obtained in this example were 37.2 mg of a yellow oily liquid with a yield of 86%, 89% ee and 82% ee, $[\alpha]_D^{25}$=−55.4 (c 1.40, CHCl$_3$); $^1$H NMR (400 MHz, CDCl$_3$) δ 7.18 (d, J=9.2 Hz, 1H), 7.09-6.95 (m, 3H), 6.54 (d, J=12.0 Hz, 1H), 5.06 (s, 1H), 3.94 (s, 3H), 3.92 (s, 3H), 2.32 (s, 6H), 1.35 (s, 6H), 1.31 (s, 6H) (minor isomer); $^1$H NMR (400 MHz, CDCl$_3$) δ 7.09-6.95 (m, 3H), 6.77 (t, J=8.0 Hz, 1H), 6.50 (d, J=8.0 Hz, 1H), 5.05 (s, 1H), 3.94 (s, 3H), 3.85 (s, 3H), 2.32 (s, 6H), 1.35 (s, 6H), 1.34 (s, 6H) (major isomer); $^{13}$C NMR (100 MHz, CDCl$_3$) δ 153.80 (d, $J_{CF}$=243.6 Hz), 152.3 (d, $J_{CF}$=243.2 Hz), 151.9 (d, $J_{CF}$=247.1 Hz), 151.9 (d, $J_{CF}$=247.1 Hz), 148.5 (d, $J_{CF}$=10.7 Hz), 147.3 (d, $J_{CF}$=14.0 Hz), 147.2 (d, $J_{CF}$=21.7 Hz), 135.1 (d, $J_{CF}$=10.5 Hz), 133.9 (d, $J_{CF}$=6.4 Hz), 128.3, 128.0, 125.1, 124.8 (d, $J_{CF}$=5.5 Hz), 120.0 (d, $J_{CF}$=3.1 Hz), 119.2 (d, $J_{CF}$=9.9 Hz), 119.1 (d, $J_{CF}$=16.0 Hz), 115.0, 112.9 (d, $J_{CF}$=6.4 Hz), 112.0 (d, $J_{CF}$=19.5 Hz), 80.8, 80.3, 73.6, 73.2, 56.5, 56.2, 41.3, 40.8, 27.6, 26.3 (mixture); HRMS (ESI) calcd for $C_{23}H_{31}BF_2NO_4$ ([M+H]$^+$) 434.2309, found 434.2312.

Upon detection, the compound of formula 8y obtained in this example was 39.8 mg of a yellow oily liquid with a yield of 90% and 85% ee, $[\alpha]_D^{25}$=−59.4 (c 1.43, CHCl$_3$). The NMR data of the compound of formula 8y was: $^1$H NMR (400 MHz, CDCl$_3$) δ 7.22 (d, J=8.0 Hz, 1H), 7.11 (s, 1H), 6.95 (t, J=9.6 Hz, 2H), 6.58 (s, 1H), 4.96 (s, 1H), 2.36 (s, 6H), 1.35 (s, 6H), 1.33 (s, 6H); $^{13}$C NMR (100 MHz, CDCl$_3$) δ 164.9 (d, $J_{CF}$=236 Hz), 162.4 (d, $J_{CF}$=240 Hz), 145.3 (d, $J_{CF}$=13 Hz), 136.1 (d, J=8 Hz), 135.6 (d, J=10 Hz), 134.3 (d, $J_{CF}$=10 Hz), 127.7 (d, $J_{CF}$=3 Hz), 120.4 (d, $J_{CF}$=3 Hz), 117.6 (d, $J_{CF}$=25 Hz), 117.0 (d, $J_{CF}$=22 Hz), 116.0 (d, $J_{CF}$=29.3 Hz), 81.2, 73.4, 41.8, 27.4, 26.4; HRMS (ESI) calcd for $C_{21}H_{25}BCl_2F_2NO_2$ ([M+H]$^+$) 442.1318, found 442.1320.

Upon detection, the compound of formula 8z obtained in this example was 38.9 mg of a yellow oily liquid with a yield of 89% and 91% ee, $[\alpha]_D^{25}$=−105.1 (c 1.01, CHCl$_3$). The NMR data of the compound of formula 8z was: $^1$H NMR (400 MHz, CDCl$_3$) δ 8.10 (s, 1H), 7.95-7.85 (m, 5H), 7.64-7.53 (m, 3H), 7.46-7.38 (m, 2H), 7.34 (t, J=7.2 Hz, 1H), 7.25 (s, 1H), 5.59 (s, 1H), 2.43 (s, 6H), 1.43 (s, 6H), 1.38 (s, 6H); $^{13}$C NMR (100 MHz, CDCl$_3$) δ 140.5, 133.8, 133.6, 133.3, 133.0, 132.6, 130.2, 129.7, 128.9, 128.2, 128.1, 127.9, 127.7, 127.7, 127.0, 126.6, 125.2, 125.0, 122.8, 80.4, 74.8, 41.0, 27.4, 26.4; HRMS (ESI) calcd for $C_{29}H_{33}BNO_2$ ([M+H]$^+$) 438.2599, found 438.2609.

In view of the above, the preparation method of the present application is simple, and can be used for preparing a racemic or chiral boron-nitrogen ligand, which can be used as a catalyst for an asymmetric catalytic reaction and has economic practicability and industrial application prospects.

In addition, the inventor of the present invention also made experiments with other raw materials and conditions listed in the specification according to the manners of Examples 1-9, which can also achieve corresponding effects, and can prepare the racemic or chiral boron-nitrogen ligand which can be used as a catalyst for an asymmetric catalytic reaction and has wide application prospects.

It should be understood that the aforementioned embodiments only illustrate the technical concept and characteristics of the present application, and their purpose is to enable those skilled in the art to understand the content of the present application and implement it accordingly, but not to limit the claimed scope of the present application. All equivalent changes or modifications made according to the spiritual essence of the present application shall be encompassed within the claimed scope of the present application.

What is claimed is:

1. A boron-nitrogen ligand with a chiral 1,2-ethylenediamine backbone, wherein a structural formula of the boron-nitrogen ligand with the chiral 1,2-ethylenediamine backbone is as shown in formula (I):

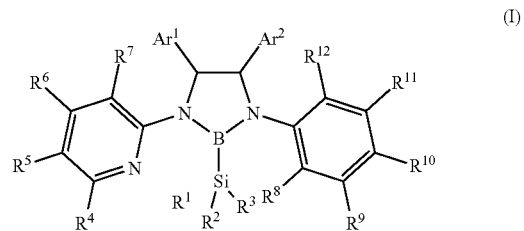

wherein $R^1$, $R^2$ and $R^3$ are respectively at least independently selected from a substituted or unsubstituted $C_3$-$C_{10}$ cycloalkyl, substituted or unsubstituted $C_1$-$C_{10}$ alkyl or a substituted or unsubstituted aryl;

$R^4$, $R^5$, $R^6$, $R^7$, $R^8$, $R^9$, $R^{10}$, $R^{11}$ and $R^{12}$ are respectively at least independently selected from hydrogen, a halogen, substituted or unsubstituted $C_1$-$C_{10}$ alkyl, a substituted or unsubstituted $C_1$-$C_4$ alkoxy, a substituted or unsubstituted $C_3$-$C_{30}$ cycloalkyl or the substituted or unsubstituted aryl;

$Ar^1$ and $Ar^2$ are respectively at least independently selected from a substituted or unsubstituted $C_6$-$C_{30}$ aryl.

2. The boron-nitrogen ligand according to claim 1, wherein the $R^1$, $R^2$ and $R^3$ are respectively at least independently selected from the substituted or unsubstituted $C_3$-$C_{10}$ cycloalkyl, substituted or unsubstituted $C_1$-$C_{10}$ alkyl or the substituted or unsubstituted aryl, wherein when $R^1$, $R^2$ and $R^3$ are substituted $C_3$-$C_{10}$ cycloalkyl, $C_1$-$C_{10}$ alkyl or aryl, substituents are at least independently selected from the halogen, a $C_1$-$C_6$ alkyl, a $C_1$-$C_6$ haloalkyl, or a $C_1$-$C_6$ alkoxy;

and/or, the $R^4$, $R^5$, $R^6$, $R^7$, $R^8$, $R^9$, $R^{10}$, $R^{11}$ and $R^{12}$ are respectively at least independently selected from a phenyl, a substituted phenyl, a $C_3$-$C_6$ cycloalkyl, a $C_2$-$C_6$ alkyl or a $C_1$-$C_4$ alkoxy, wherein when $R^1$, $R^2$ and $R^3$ are substituted $C_3$-$C_{10}$ cycloalkyl, $C_1$-$C_{10}$ alkyl or aryl, substituents are at least independently selected from the halogen, the $C_1$-$C_6$ alkyl, the $C_1$-$C_6$ haloalkyl, or the $C_1$-$C_6$ alkoxy;

and/or, the $Ar^1$ and $Ar^2$ are respectively at least independently selected from the substituted or unsubstituted $C_6$-$C_{30}$ aryl, wherein when $R^1$, $R^2$ and $R^3$ are substituted $C_3$-$C_{10}$ cycloalkyl, $C_1$-$C_{10}$ alkyl or aryl, substituents are at least independently selected from the halogen, the $C_1$-$C_6$ alkyl, the $C_1$-$C_6$ haloalkyl, or the $C_1$-$C_6$ alkoxy;

and/or, the $Ar^1$ and $Ar^2$ is at least one selected from the group consisting of phenyl, phenylene, naphthyl, naphthylene, pyrenyl, anthracenyl and phenanthryl;

and/or, the $Ar^1$ has the same structure as the $Ar^2$.

3. The boron-nitrogen ligand according to claim 2, wherein the boron-nitrogen ligand comprises a structure as shown in any one of the formulas (Ia) to (Id) below:

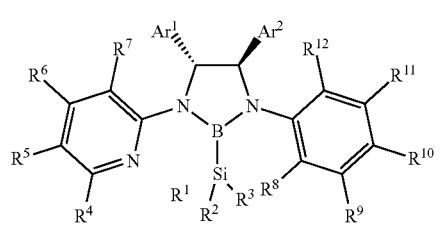

Ia

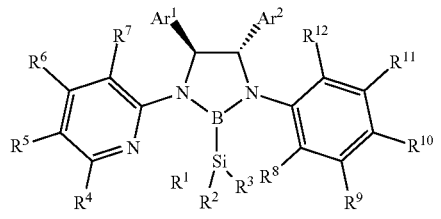

Ib

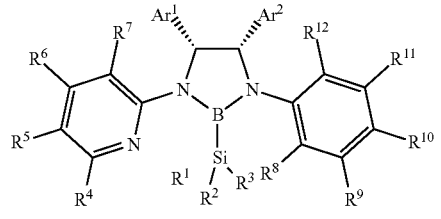

Ic

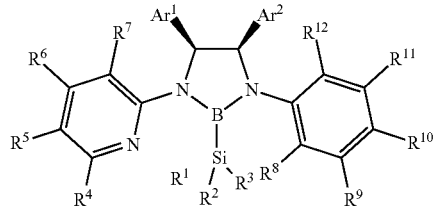

Id wherein the $R^1$, $R^2$ and $R^3$ are respectively at least independently selected from the substituted or unsubstituted $C_3$-$C_{10}$ cycloalkyl, substituted or unsubstituted $C_1$-$C_{10}$ alkyl or the substituted or unsubstituted aryl;

the $R^4$, $R^5$, $R^6$, $R^7$, $R^8$, $R^9$, $R^{10}$, $R^{11}$ and $R^{12}$ are respectively at least independently selected from hydrogen, the halogen, substituted or unsubstituted $C_1$-$C_{10}$ alkyl, the substituted or unsubstituted $C_1$-$C_4$ alkoxy, the substituted or unsubstituted $C_3$-$C_{30}$ cycloalkyl or the substituted or unsubstituted aryl;

the $Ar^1$ and $Ar^2$ are respectively at least independently selected from the substituted or unsubstituted $C_6$-$C_{30}$ aryl;

wherein the boron-nitrogen ligand comprises structure of any one of the above-mentioned formulas (Ia)-(Id), or an enantiomer, a racemate or a diastereomer of the structure as shown in any one of the above-mentioned formulas (Ia)-(Id).

4. The boron-nitrogen ligand according to claim 1, wherein the boron-nitrogen ligand comprises a structure as shown in any one of the formulas (Ia) to (Id) below:

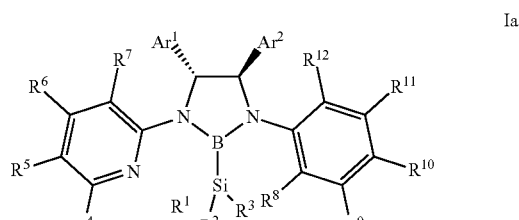

Ia

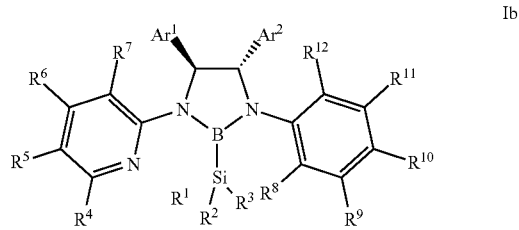

Ib

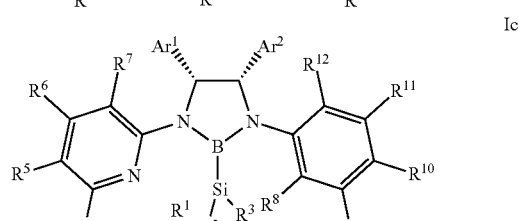

Ic

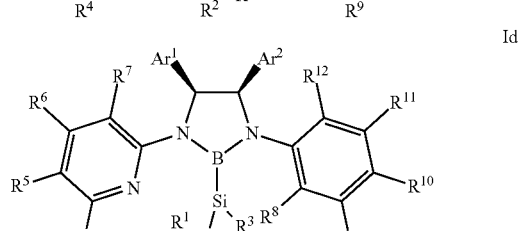

Id wherein the $R^1$, $R^2$ and $R^3$ are respectively at least independently selected from the substituted or unsubstituted $C_3$-$C_{10}$ cycloalkyl, substituted or unsubstituted $C_1$-$C_{10}$ alkyl or the substituted or unsubstituted aryl;

the $R^4$, $R^5$, $R^6$, $R^7$, $R^8$, $R^9$, $R^{10}$, $R^{11}$ and $R^{12}$ are respectively at least independently selected from the hydrogen, the halogen, substituted or unsubstituted $C_1$-$C_{10}$ alkyl, the substituted or unsubstituted $C_1$-$C_4$ alkoxy, the substituted or unsubstituted $C_3$-$C_{30}$ cycloalkyl or the substituted or unsubstituted aryl;

the $Ar^1$ and $Ar^2$ are respectively at least independently selected from the substituted or unsubstituted $C_6$-$C_{30}$ aryl;

wherein the boron-nitrogen ligand comprises the structure of any one of the above-mentioned formulas (Ia)-(Id), or an enantiomer, a racemate or a diastereomer of the structure as shown in any one of the above-mentioned formulas (Ia)-(Id).

5. The boron-nitrogen ligand according to claim 4, wherein the boron-nitrogen ligand comprises a structure of any one of the following formulas (6a)-(6j), or an enantiomer, a racemate or a diastereomer of the structure of any one of the following formulas (6a)-(6j)

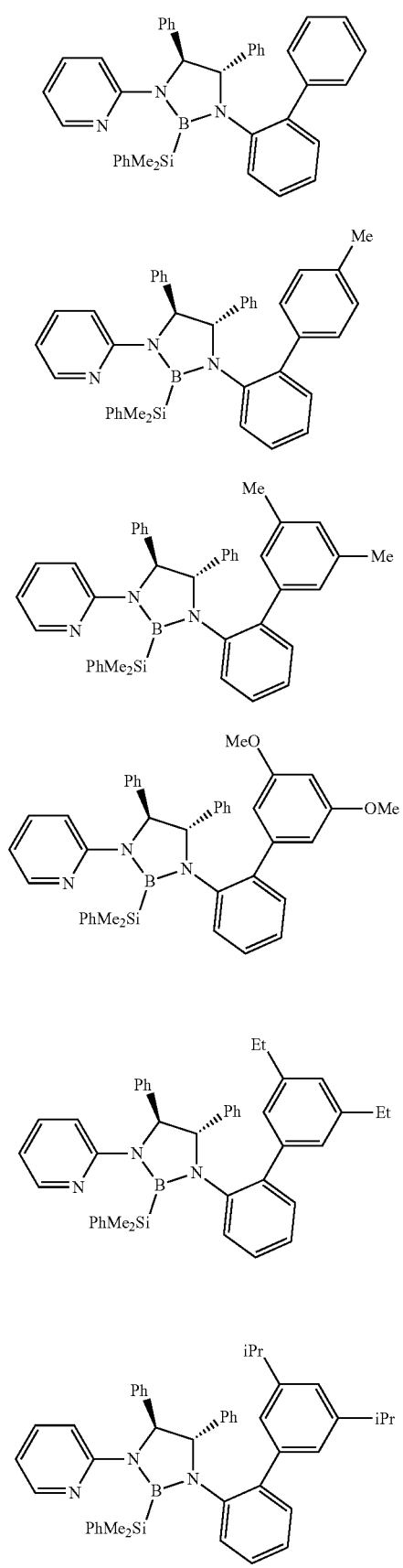
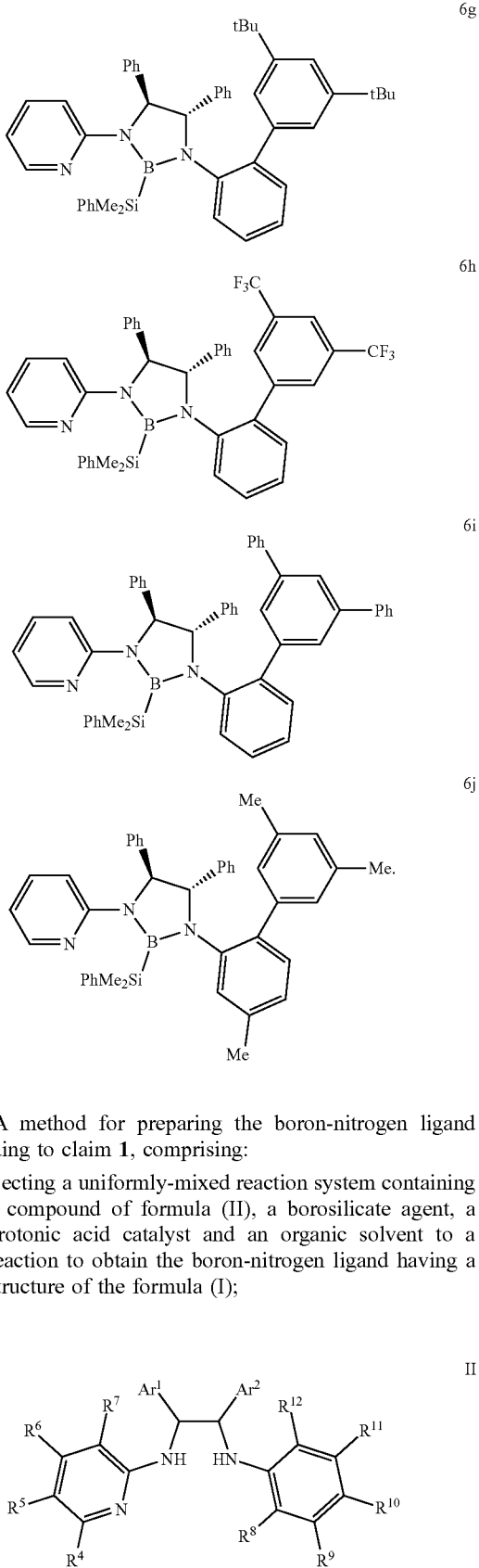
6. A method for preparing the boron-nitrogen ligand according to claim 1, comprising:
subjecting a uniformly-mixed reaction system containing a compound of formula (II), a borosilicate agent, a protonic acid catalyst and an organic solvent to a reaction to obtain the boron-nitrogen ligand having a structure of the formula (I);
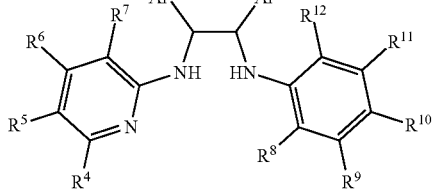

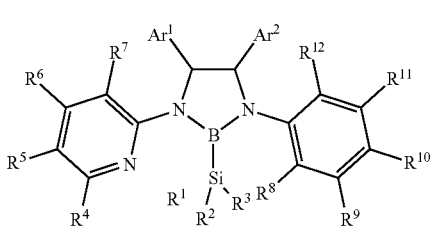

wherein, in the formula (I) and the formula (II), the $R^1$, $R^2$ and $R^3$ are respectively at least independently selected from the substituted or unsubstituted $C_3$-$C_{10}$ cycloalkyl, substituted or unsubstituted $C_1$-$C_{10}$ alkyl or the substituted or unsubstituted aryl;

the $R^4$, $R^5$, $R^6$, $R^7$, $R^8$, $R^9$, $R^{10}$, $R^{11}$ and $R^{12}$ are respectively at least independently selected from the hydrogen, the halogen, substituted or unsubstituted $C_1$-$C_{10}$ alkyl, the substituted or unsubstituted $C_1$-$C_4$ alkoxy, the substituted or unsubstituted $C_3$-$C_{30}$ cycloalkyl or the substituted or unsubstituted aryl;

the $Ar^1$ and $Ar^2$ are respectively at least independently selected from the substituted or unsubstituted $C_6$-$C_{30}$ aryl.

7. The method according to claim 6, wherein the $Ar^1$ has the same structure as the $Ar^2$;

and/or, a chemical formula of the borosilicate agent is $R_1R_2R_3Si$—$B(NiPr_2)_2$, wherein the $R^1$, $R^2$ and $R^3$ are respectively at least independently selected from the substituted or unsubstituted $C_3$-$C_{10}$ cycloalkyl, substituted or unsubstituted $C_1$-$C_{10}$ alkyl or the substituted or unsubstituted aryl.

8. The method according to claim 7, wherein a molar ratio of the borosilicate agent to the compound of the formula (II) is 1:1-3:1, and 1.5:1-2:1;

and/or, a molar ratio of the protonic acid catalyst to the compound of the formula (II) is 0.001:1-1:1, and 0.05:1-0.5:1;

and/or, the protonic acid catalyst is at least one selected from the group consisting of $H_2SO_4$, $H_3PO_4$, HCl, HBr, $CH_3CO_2H$, $PhCO_2H$, $CF_3CO_2H$, $CF_3SO_3H$, p-$CH_3$—$C_6H_5SO_3H$, $MeSO_3H$ and $tBuCO_2H$, and HCl;

and/or, the organic solvent is at least one selected from the group consisting of benzene, toluene, xylene, dichloromethane, chloroform, carbon tetrachloride, 1,2-dichloroethane, diethyl ether, 1,4-dioxane, tetrahydrofuran, methanol, ethanol, N,N-dimethylformamide and dimethyl sulfoxide;

and/or, a temperature of the reaction is 0-180° C., and 80-180° C., and a time of the reaction is 1-48 h, and 12-36 h.

9. The method according to claim 6, wherein a molar ratio of the borosilicate agent to the compound of the formula (II) is 1:1-3:1, and 1.5:1-2:1;

and/or, a molar ratio of the protonic acid catalyst to the compound of the formula (II) is 0.001:1-1:1, and 0.05:1-0.5:1;

and/or, the protonic acid catalyst is at least one selected from the group consisting of $H_2SO_4$, $H_3PO_4$, HCl, HBr, $CH_3CO_2H$, $PhCO_2H$, $CF_3CO_2H$, $CF_3SO_3H$, p-$CH_3$—$C_6H_5SO_3H$, $MeSO_3H$ and $tBuCO_2H$, and HCl;

and/or, the organic solvent is at least one selected from the group consisting of benzene, toluene, xylene, dichloromethane, chloroform, carbon tetrachloride, 1,2-dichloroethane, diethyl ether, 1,4-dioxane, tetrahydrofuran, methanol, ethanol, N,N-dimethylformamide and dimethyl sulfoxide;

and/or, a temperature of the reaction is 0-180° C., and 80-180° C., and a time of the reaction is 1-48 h, and 12-36 h.

10. The method according to claim 6, wherein the $R^1$, $R^2$ and $R^3$ are respectively at least independently selected from the substituted or unsubstituted $C_3$-$C_{10}$ cycloalkyl, substituted or unsubstituted $C_1$-$C_{10}$ alkyl or the substituted or unsubstituted aryl, wherein when $R^1$, $R^2$ and $R^3$ are substituted $C_3$-$C_{10}$ cycloalkyl, $C_1$-$C_{10}$ alkyl or aryl, substituents are at least independently selected from the halogen, a $C_1$-$C_6$ alkyl, a $C_1$-$C_6$ haloalkyl, or a $C_1$-$C_6$ alkoxy;

and/or, the $R^4$, $R^5$, $R^6$, $R^7$, $R^8$, $R^9$, $R^{10}$, $R^{11}$ and $R^{12}$ are respectively at least independently selected from a phenyl, a substituted phenyl, a $C_3$-$C_6$ cycloalkyl, a $C_2$-$C_6$ alkyl or a $C_1$-$C_4$ alkoxy, wherein when $R^1$, $R^2$ and $R^3$ are substituted $C_3$-$C_{10}$ cycloalkyl, $C_1$-$C_{10}$ alkyl or aryl, substituents are at least independently selected from the halogen, the $C_1$-$C_6$ alkyl, the $C_1$-$C_6$ haloalkyl, or the $C_1$-$C_6$ alkoxy;

and/or, the $Ar^1$ and $Ar^2$ are respectively at least independently selected from the substituted or unsubstituted $C_6$-$C_{30}$ aryl, wherein when $R^1$, $R^2$ and $R^3$ are substituted $C_3$-$C_{10}$ cycloalkyl, $C_1$-$C_{10}$ alkyl or aryl, substituents are at least independently selected from the halogen, the $C_1$-$C_6$ alkyl, the $C_1$-$C_6$ haloalkyl, or the $C_1$-$C_6$ alkoxy;

and/or, the $Ar^1$ and $Ar^2$ is at least one selected from the group consisting of phenyl, phenylene, naphthyl, naphthylene, pyrenyl, anthracenyl and phenanthryl;

and/or, the $Ar^1$ has the same structure as the $Ar^2$.

11. The method according to claim 6, wherein the boron-nitrogen ligand comprises a structure as shown in any one of the formulas (Ia) to (Id) below:

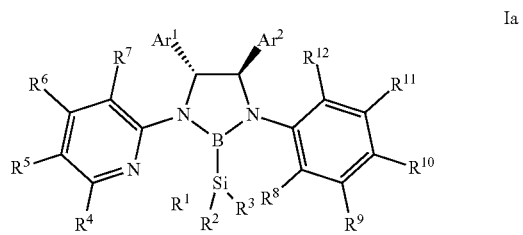

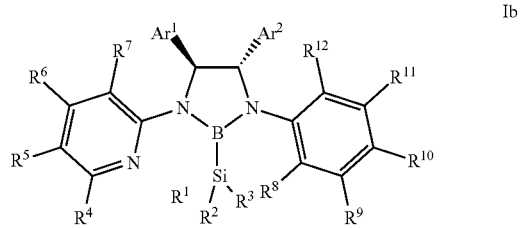

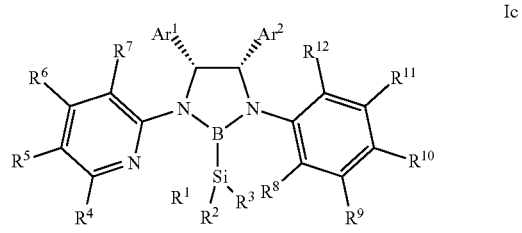

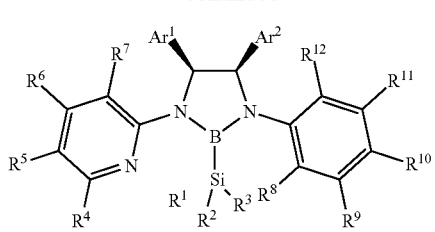

Id wherein the $R^1$, $R^2$ and $R^3$ are respectively at least independently selected from the substituted or unsubstituted $C_3$-$C_{10}$ cycloalkyl, substituted or unsubstituted $C_1$-$C_{10}$alkyl or the substituted or unsubstituted aryl;

the $R^4$, $R^5$, $R^6$, $R^7$, $R^8$, $R^9$, $R^{10}$, $R^{11}$ and $R^{12}$ are respectively at least independently selected from the hydrogen, the halogen, substituted or unsubstituted $C_1$-$C_{10}$ alkyl, the substituted or unsubstituted $C_1$-$C_4$ alkoxy, the substituted or unsubstituted $C_3$-$C_{30}$ cycloalkyl or the substituted or unsubstituted aryl;

the $Ar^1$ and $Ar^2$ are respectively at least independently selected from the substituted or unsubstituted $C_6$-$C_{30}$ aryl;

wherein the boron-nitrogen ligand comprises structure of any one of the above-mentioned formulas (Ia)-(Id), or an enantiomer, a racemate or a diastereomer of the structure as shown in any one of the above-mentioned formulas (Ia)-(Id).

12. The method according to claim 11, wherein the boron-nitrogen ligand comprises a structure of any one of the following formulas (6a)-(6j), or an enantiomer, a racemate or a diastereomer of the structure of any one of the following formulas (6a)-(6j)

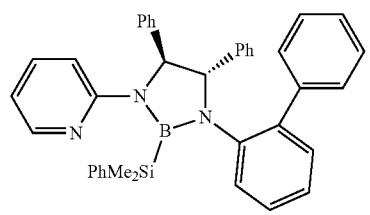

6a

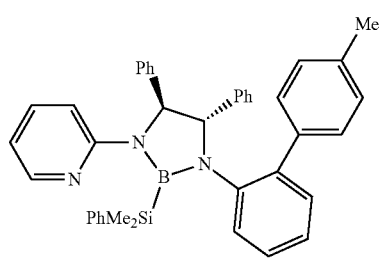

6b

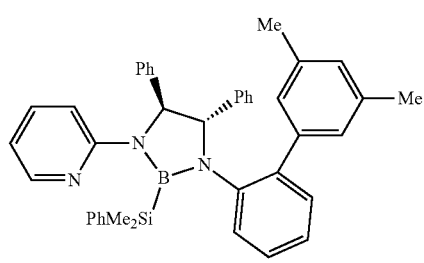

6c

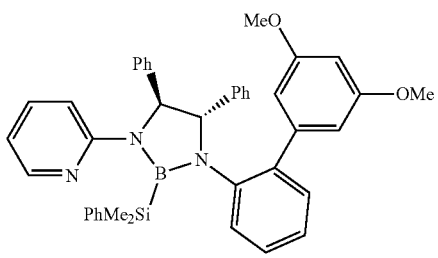

6d

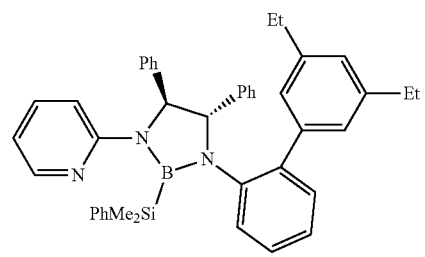

6e

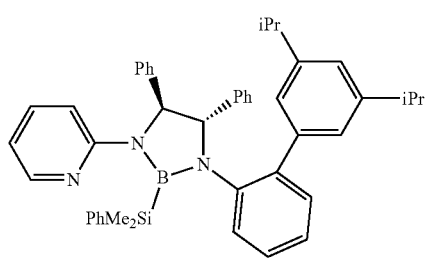

6f

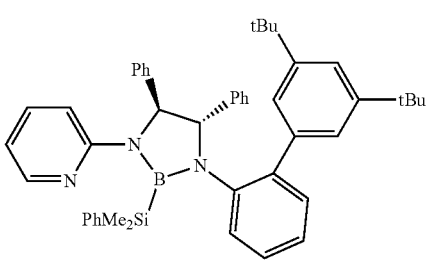

6g

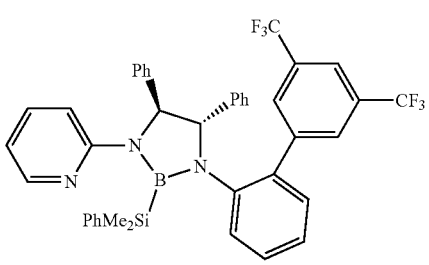

6h

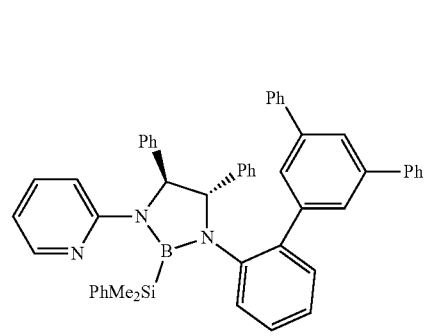

6i

-continued

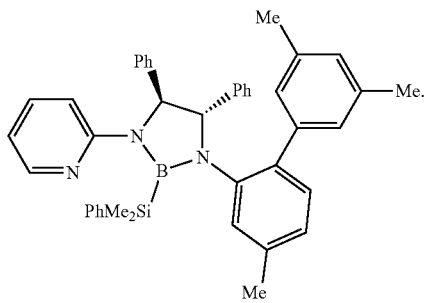

6j

13. A method where the boron-nitrogen ligand according to claim 1 forms a complex with a transition metal and the complex catalyzes an asymmetric catalytic reaction.

14. The method according to claim 13, wherein the $R^1$, $R^2$ and $R^3$ are respectively at least independently selected from the substituted or unsubstituted $C_3$-$C_{10}$ cycloalkyl, substituted or unsubstituted $C_1$-$C_{10}$ alkyl or the substituted or unsubstituted aryl, wherein when $R^1$, $R^2$ and $R^3$ are substituted $C_3$-$C_{10}$ cycloalkyl, $C_1$-$C_{10}$ alkyl or aryl, substituents are at least independently selected from the halogen, a $C_1$-$C_6$ alkyl, a $C_1$-$C_6$ haloalkyl, or a $C_1$-$C_6$ alkoxy;

and/or, the $R^4$, $R^5$, $R^6$, $R^7$, $R^8$, $R^9$, $R^{10}$, $R^{11}$ and $R^{12}$ are respectively at least independently selected from a phenyl, a substituted phenyl, a $C_3$-$C_6$ cycloalkyl, a $C_2$-$C_6$ alkyl or a $C_1$-$C_4$ alkoxy, wherein when $R^1$, $R^2$ and $R^3$ are substituted $C_3$-$C_{10}$ cycloalkyl, $C_1$-$C_{10}$ alkyl or aryl, substituents are at least independently selected from the halogen, the $C_1$-$C_6$ alkyl, the $C_1$-$C_6$ haloalkyl, or the $C_1$-$C_6$ alkoxy;

and/or, the $Ar^1$ and $Ar^2$ are respectively at least independently selected from the substituted or unsubstituted $C_6$-$C_{30}$ aryl, wherein when $R^1$, $R^2$ and $R^3$ are substituted $C_3$-$C_{10}$ cycloalkyl, $C_1$-$C_{10}$ alkyl or aryl, substituents are at least independently selected from the halogen, the $C_1$-$C_6$ alkyl, the $C_1$-$C_6$ haloalkyl, or the $C_1$-$C_6$ alkoxy;

and/or, the aryl is at least one selected from the group consisting of phenyl, phenylene, naphthyl, naphthylene, pyrenyl, anthracenyl and phenanthryl;

and/or, the $Ar^1$ has the same structure as the $Ar^2$.

15. The method according to claim 13, wherein the boron-nitrogen ligand comprises a structure as shown in any one of the formulas (Ia) to (Id) below:

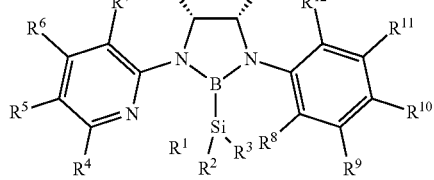

Ic

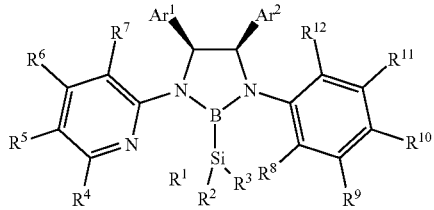

Id wherein the $R^1$, $R^2$ and $R^3$ are respectively at least independently selected from the substituted or unsubstituted $C_3$-$C_{10}$ cycloalkyl, substituted or unsubstituted $C_1$-$C_{10}$ alkyl or the substituted or unsubstituted aryl;

the $R^4$, $R^5$, $R^6$, $R^7$, $R^8$, $R^9$, $R^{10}$, $R^{11}$ and $R^{12}$ are respectively at least independently selected from the hydrogen, the halogen, substituted or unsubstituted $C_1$-$C_{10}$ alkyl, the substituted or unsubstituted $C_1$-$C_4$ alkoxy, the substituted or unsubstituted $C_3$-$C_{30}$ cycloalkyl or the substituted or unsubstituted aryl;

the $Ar^1$ and $Ar^2$ are respectively at least independently selected from the substituted or unsubstituted $C_6$-$C_{30}$ aryl;

wherein the boron-nitrogen ligand comprises structure of any one of the above-mentioned formulas (Ia)-(Id), or an enantiomer, a racemate or a diastereomer of the structure as shown in any one of the above-mentioned formulas (Ia)-(Id).

16. The method according to claim 13, wherein the boron-nitrogen ligand comprises a structure of any one of the following formulas (6a)-(6j), or an enantiomer, a racemate or a diastereomer of the structure of any one of the following formulas (6a)-(6j)

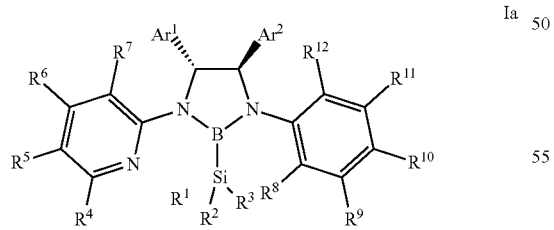

Ia

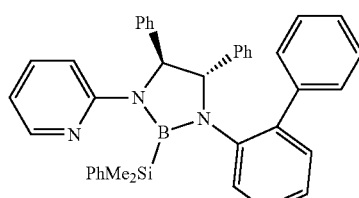

6a

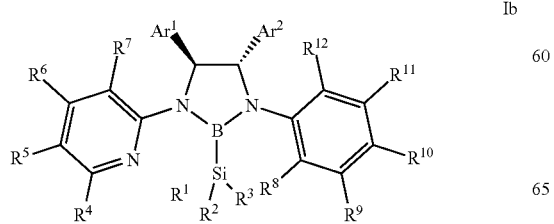

Ib

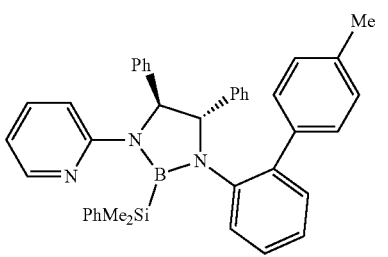

6b

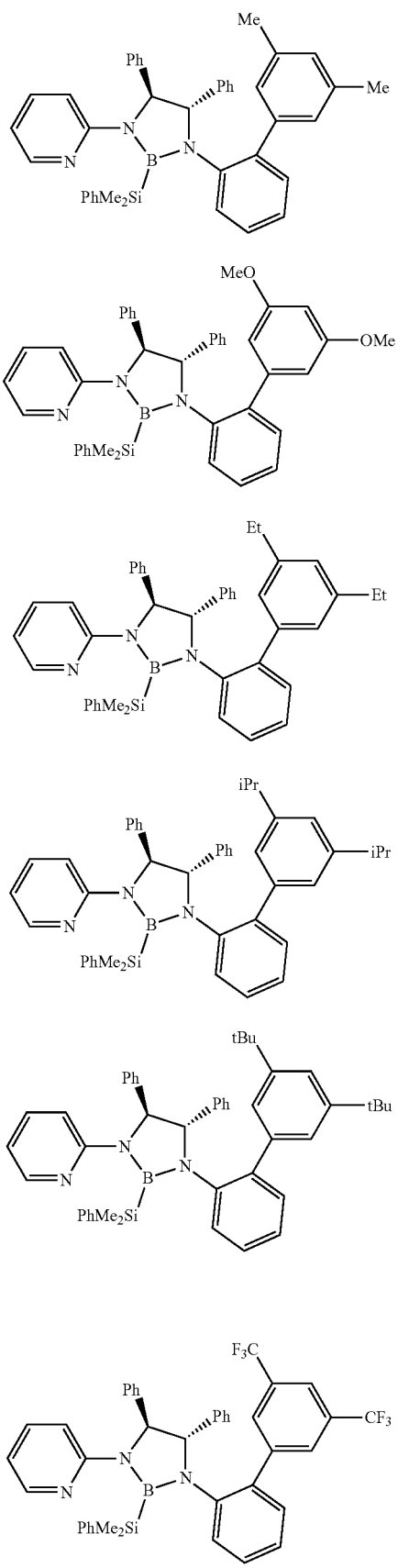

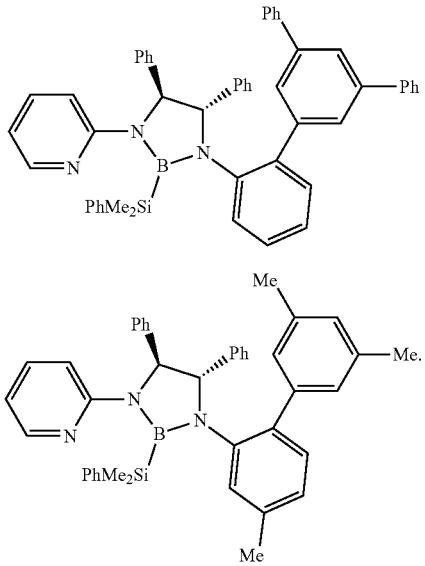

17. A catalyst for use in an asymmetric catalytic reaction, wherein the catalyst is formed by a complexation reaction between the boron-nitrogen ligand according to claim 1 and a transition metal; wherein the catalyst is used in a asymmetric carbon-hydrogen bond activation boronization reaction of diarylmethylamine.

18. A method for preparing a class of chiral diarylmethylamine compounds, comprising:
reacting a compound of formula (III) under an action of the catalyst according to claim 9 to obtain a compound of formula (IV);

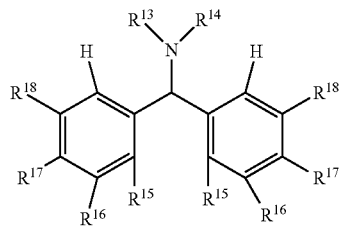

III

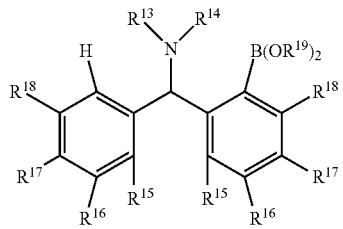

IV wherein, in the formulas (III) and (IV), $R^{13}$ and $R^{14}$ are respectively at least independently selected from the hydrogen, substituted or unsubstituted $C_1$-$C_{10}$ alkyl or the substituted or unsubstituted $C_3$-$C_{30}$ cycloalkyl; substituted or unsubstituted $C_1$-$C_{10}$ alkyl or the substituted or unsubstituted aryl;

$R^{15}$, $R^{16}$, $R^{17}$ and $R^{18}$ are respectively at least independently selected from the hydrogen, the halogen, an ester group, an amide group, acyl, an amino group, substituted or unsubstituted $C_1$-$C_{10}$ alkyl, the substituted or unsubstituted $C_1$-$C_4$ alkoxy, and the substituted or unsubstituted $C_3$-$C_{30}$ cycloalkyl or the substituted or unsubstituted aryl;

$R^{19}$ is at least independently selected from substituted or unsubstituted $C_1$-$C_{10}$ alkyl or the substituted or unsubstituted $C_3$-$C_{30}$ cycloalkyl;

wherein a molar ratio of the catalyst to the compound of the formula (III) is 0.001:1-0.02:1;

wherein a temperature of the reaction is 40-100° C. and a time of the reaction is 2-72 h.

19. The catalyst according to claim 17, wherein the $R^1$, $R^2$ and $R^3$ are respectively at least independently selected from the substituted or unsubstituted $C_3$-$C_{10}$ cycloalkyl, substituted or unsubstituted $C_1$-$C_{10}$ alkyl or the substituted or unsubstituted aryl, wherein a number of first substituents used for a first substitution is more than one, 1-3; wherein the first substituents are at least independently selected from the halogen, a $C_1$-$C_6$ alkyl, a $C_1$-$C_6$ haloalkyl, or a $C_1$-$C_6$ alkoxy;

and/or, the $R^4$, $R^5$, $R^6$, $R^7$, $R^8$, $R^9$, $R^{10}$, $R^{11}$ and $R^{12}$ are respectively at least independently selected from a phenyl, a substituted phenyl, a $C_3$-$C_6$ cycloalkyl, a $C_2$-$C_6$ alkyl or a $C_1$-$C_4$ alkoxy, wherein a number of second substituents used for a second substitution is more than one, 1-3; wherein the second substituents are at least independently selected from the halogen, the $C_1$-$C_6$ alkyl, the $C_1$-$C_6$ haloalkyl, or the $C_1$-$C_6$ alkoxy;

and/or, the $Ar^1$ and $Ar^2$ are respectively at least independently selected from the substituted or unsubstituted $C_6$-$C_{30}$ aryl, wherein a number of third substituents used for a third substitution is more than one, preferably 1-3; wherein the third substituents are at least independently selected from the halogen, the $C_1$-$C_6$ alkyl, the $C_1$-$C_6$ haloalkyl, or the $C_1$-$C_6$ alkoxy;

and/or, the $Ar^1$ and $Ar^2$ is at least one selected from the group consisting of phenyl, phenylene, naphthyl, naphthylene, pyrenyl, anthracenyl and phenanthryl;

and/or, the $Ar^1$ has the same structure as the $Ar^2$.

20. The catalyst according to claim 17, wherein the boron-nitrogen ligand comprises a structure as shown in any one of the formulas (Ia) to (Id) below:

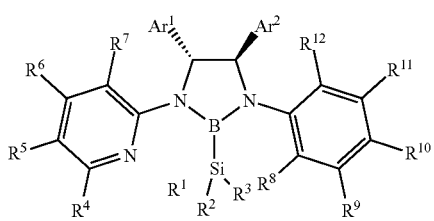

Ia

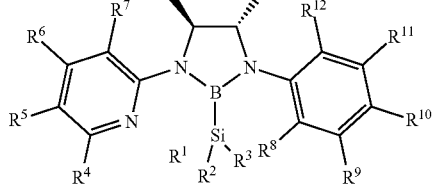

Ib

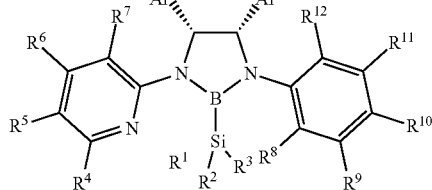

Ic

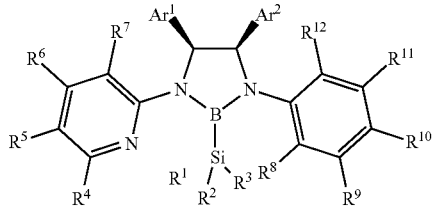

Id wherein the $R^1$, $R^2$ and $R^3$ are respectively at least independently selected from the substituted or unsubstituted $C_3$-$C_{10}$ cycloalkyl, the substituted or unsubstituted alkyl or the substituted or unsubstituted aryl;

the $R^4$, $R^5$, $R^6$, $R^7$, $R^8$, $R^9$, $R^{10}$, $R^{11}$ and $R^{12}$ are respectively at least independently selected from the hydrogen, the halogen, substituted or unsubstituted $C_1$-$C_{10}$ alkyl, the substituted or unsubstituted $C_1$-$C_4$ alkoxy, the substituted or unsubstituted $C_3$-$C_{30}$ cycloalkyl or the substituted or unsubstituted aryl;

the $Ar^1$ and $Ar^2$ are respectively at least independently selected from the substituted or unsubstituted $C_6$-$C_{30}$ aryl;

wherein the boron-nitrogen ligand comprises structure of any one of the above-mentioned formulas (Ia)-(Id), or an enantiomer, a racemate or a diastereomer of the structure as shown in any one of the above-mentioned formulas (Ia)-(Id).

* * * * *